US011468237B2

(12) United States Patent
Boston et al.

(10) Patent No.: US 11,468,237 B2
(45) Date of Patent: *Oct. 11, 2022

(54) AUDIT INVESTIGATION TOOL

(71) Applicant: KPMG LLP, New York, NY (US)

(72) Inventors: Marisa Ferrara Boston, Denver, CO (US); Dustin Richard Devoogd, Grand Rapids, MI (US); Bruce Erb, New York, NY (US); Adam Christopher Fiebig, Wyoming, MI (US); Nichole Jean Hansen, Redwood City, CA (US); Richard Donald Pringle, II, Grand Rapids, MI (US); Raghuram Srinivas, Frisco, TX (US)

(73) Assignee: KPMG LLP, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/243,440

(22) Filed: Apr. 28, 2021

(65) Prior Publication Data
US 2021/0248319 A1  Aug. 12, 2021

Related U.S. Application Data

(63) Continuation-in-part of application No. 15/977,636, filed on May 11, 2018, now Pat. No. 11,010,832.

(51) Int. Cl.
*G06F 40/284* (2020.01)
*G06V 30/416* (2022.01)
*G06V 30/412* (2022.01)
*G06Q 40/02* (2012.01)

(52) U.S. Cl.
CPC ......... *G06F 40/284* (2020.01); *G06Q 40/025* (2013.01); *G06V 30/412* (2022.01); *G06V 30/416* (2022.01)

(58) Field of Classification Search
None
See application file for complete search history.

(56) References Cited

U.S. PATENT DOCUMENTS

| 9,043,197 | B1* | 5/2015 | Pasca | G06F 40/30 |
| 9,946,924 | B2 | 4/2018 | Sengupta et al. | |
| 2001/0044766 | A1 | 11/2001 | Keyes | |
| 2002/0052815 | A1 | 5/2002 | Johnson | |
| 2011/0231387 | A1* | 9/2011 | Jain | G06F 16/951 |
| 2012/0262461 | A1 | 10/2012 | Fisher | |

(Continued)

OTHER PUBLICATIONS

Xu, et al., in "Reinforcement Learning to Rank with Markov Decision Process" in SIGIR (Year: 2017).*

(Continued)

*Primary Examiner* — Mike Anderson
*Assistant Examiner* — Brandon M Duck
(74) *Attorney, Agent, or Firm* — Hunton Andrews Kurth LLP

(57) ABSTRACT

The invention relates to a computer-implemented system and method for providing an Audit Document Investigation Tool that augments the audit process at various investigation stages. As a critical component of audit technology initiatives, the Audit Document Investigation Tool provides a consistent, efficient workflow to ingest, automatically prioritize and investigate documents, leverageable by any procedure workflow and linkable to platforms for full audit trail and subsequent review.

20 Claims, 16 Drawing Sheets

(56) References Cited

U.S. PATENT DOCUMENTS

| | | |
|---|---|---|
| 2015/0254719 A1 | 9/2015 | Barfield, Jr. |
| 2015/0310072 A1* | 10/2015 | Dietz .................... G06F 16/22 |
| 2016/0117393 A1* | 4/2016 | von Rickenbach .... G06Q 30/06 |
| 2018/0039889 A1* | 2/2018 | Nanavati ................ G06F 16/93 |
| 2019/0205978 A1 | 7/2019 | Way |
| 2019/0355058 A1 | 11/2019 | Huang |

OTHER PUBLICATIONS

Vimeo Video link, https://vimeo.com/217172396/21c0531e29: IBM World of Watson 2016_Steve Hill KPMG Keynote-HD (4:24), May 12, 2017.

Vimeo Video link https://vimeo.com/218543153: KPMG commercial mortgage loan audit process use case demonstration (5:00), May 22, 2017.

World of Watson: General Session; D. Kenny and J. Kelly (speakers) (85:00), Oct. 17, 2016 (20 pp).

Adler, et al., Apr. 2017, in "Auditing block-box models for indirect influence," in Knowledge Information Systems, vol. 54, pp. 95-122.

Cooper, et al., "An evaluation of machine-learning methods for predicting pneumonia mortality," in Artificial Intelligence in Medicine, pp. 107-138 (Year: 1997).

Kotslantis, "Efficiency of Machine Learning Techniques in Bankruptcy Prediction," pp. 38-49 (Year: 2005).

\* cited by examiner

| ID | Level | Confidence Factor |
|---|---|---|
| 1 | NLP Evidence | Annotator Rule F1 |
| 2 | NLP Evidence | Variance of extracted values |
| 3 | NLP Evidence | Document type accuracy |
| 4 | NLP Evidence | Document date F1 |
| 5 | NLP Evidence | Resolution strategy confidence |
| 6 | NLP Evidence | Summary confidence on each attribute |
| 7 | Table Extracted Attribute | Relevance score of extraction of attribute from tables |
| 8 | Resolved Attribute | Resolution of extracted attribute F1 |
| 9 | Resolved Attribute | Formula used for calculated attribute |
| 10 | Calculated Attribute | Confidence on input attributes |
| 11 | Calculated Attribute | Calculated attribute confidence |
| 12 | Loan Risk Rating | grade model confidence |
| 13 | Loan Risk Rating | Confidence on input attributes |
|  | Loan Processing Confidence | Combined (aggregated) confidence |

Figure 3

CMLA

Engagement 1 Summary

Credit Files

- Not Started 20% ####
- In Progress 40% ####
- In Review 10% ####
- Complete 30% ####

Created MM / DD / YYYY
Created MM / DD / YYYY

Home / Engagement 1 / Credit Files
Credit Files (10) — 502
Search for a credit file Import
←1 of 1→

| Name ▾ | Attributes Accepted ▾ | Doc. Processing ▾ | Total Docs ▾ (504) | Client Grade ▾ (506) | Auditor Grade (508) | Confidence ▾ (510) | Status ▾ | |
|---|---|---|---|---|---|---|---|---|
| Credit File Name | ##% (# / ##) | ▾ | ## | # | # | HIGH | ○ In Review | (WW) |
| Credit File Name | ##% (# / ##) | ▾ | ## | # | # | MEDIUM | ○ Not Started | +  |
| Credit File Name | ##% (# / ##) | ▾ | ## | # | # | MEDIUM | ○ Complete | (WW) |
| Credit File Name | ##% (# / ##) | ▾ | ## | # | # | HIGH | ○ In Progress | (WW) |
| Credit File Name | ##% (# / ##) | ▾ | ## | # | # | MEDIUM | ○ In Progress | (MA) |
| Credit File Name | ##% (# / ##) | ▾ | ## | # | # | LOW | ○ Not Started | +  |
| Credit File Name | ##% (# / ##) | ▾ | ## | # | # | HIGH | ○ In Progress | (LS) |
| Credit File Name | ##% (# / ##) | ▾ | ## | # | # | HIGH | ○ In Progress | (WW) |
| Credit File Name | ##% (# / ##) | ▾ | ## | # | # | MEDIUM | ○ Complete | (WW) |
| Credit File Name | ##% (# / ##) | ▾ | ## | # | # | HIGH | ○ Complete | (WW) |

AUDIT INVESTIGATION TOOL

CROSS REFERENCE TO RELATED APPLICATIONS

This Patent Application is a Continuation-in-Part (CIP) of U.S. patent application Ser. No. 15/977,636, filed May 11, 2018, the complete disclosure of which is incorporated herein by reference in its entirety.

FIELD OF THE INVENTION

The present invention relates generally to a loan audit system, and more particularly to a system and method for grading of bank loans with chained confidence scoring and an audit document investigation tool with augmentation and automation.

BACKGROUND

Banks and other financial institutions maintain portfolios of loans such as commercial mortgage loans. Given the risks associated with borrowers that become financially distressed, it is important for such financial institutions to be able to audit their loan portfolios to maintain current and accurate information on the level of risk of default. The value attributed to a portfolio of loans is also an important factor in determining whether a lending agency's reserves are correctly set. Known methods for auditing a portfolio of loans typically comprise a process that is largely dependent on the experience and judgment of individual auditors. For example, a bank may send its credit files for a portfolio of loans to an auditor. If there are a large number of loans, the auditor may begin by determining a representative sample of the loans to analyze within the portfolio, e.g., 40-60 of the loans. This step inherently introduces risk because it eliminates some portion of the loans from the analysis.

Next, a subject matter expert ("SME"), such as an experienced commercial mortgage loan auditor, reviews the credit file documents and locates and interprets relevant facts and attributes, such as the loan amount, type of collateral, payment history, primary source of repayment (PSOR), guarantor, appraised value, and third party information. The SME may consider primary and secondary sources for the facts and attributes. Primary sources may include the actual loan documents. Secondary sources may include third party information relevant to the appraised value or the collateral.

The SME will typically analyze dozens of files and hundreds of pages in his or her analysis of a loan. In this process, the SME may disambiguate multiple instances of an attribute across files, such as identifying a single loan type based on differing descriptions of the loan type in the credit file. The SME may also discover evidence of anomalies beyond explicit facts that impact the risk rating. For example, the SME may uncover anomalies in the loan documents that have a bearing on the borrower's risk of default.

Based on his or her experience and guidelines, the SME makes a judgment as to the appropriate loan risk rating. Typically, a formula is not used to perform a calculation, and conclusions are drawn from multiple reviews. It is not uncommon for two different SMEs to adjudicate different loan risk ratings for the same commercial mortgage loan. The SMEs resolve differences through additional human reviews and discussions. The SMEs may also provide an overall confidence value, based on their experience and judgment, which specifies the SME's level of confidence that the loan risk rating is correct. There is no calculation or quantification used to arrive at the overall confidence value; rather, it is chosen by the individual auditor based on his or her judgment and interpretation of various documents in the credit file as well as any applicable internal guidelines.

Although the known processes generally provide an acceptable level of accuracy, there are certain disadvantages, such as the need to reconcile differing conclusions, the reliance on human experience and judgment, the need to rely on only a small sample of loans in the portfolio that are reviewed, and the expense of labor involved in the process. Accordingly, it would be desirable to have an automated system and method to overcome these and other disadvantages.

SUMMARY

According to one embodiment, the invention relates to an Audit Document Investigation Tool that provides augmentation for various stages throughout an audit process. An embodiment of the present invention guides an auditor through the analysis with augmented context and intelligence and also provides flexibility so that the auditor may deviate and investigate as the process leads and the collected information dictates. As a critical component of audit technology initiatives, the Audit Document Investigation Tool provides a consistent and efficient workflow to ingest, automatically prioritize and investigate documents, leverageable by any procedure workflow and linkable to audit platforms for full audit trail and subsequent review.

Exemplary embodiments of the invention can provide a number of advantages to auditors using the system. The Audit Document Investigation Tool is a key initiative in an entity's audit transformation journey, providing benefits across several strategic avenues. Various benefits may be achieved including labor efficiency, revenue retention and augmented quality. In addition, an embodiment of the present invention enables auditors to navigate and find content faster and more reliably. Augmenting the auditor's investigation process facilities fact finding within documents to support and confirm determinations. This leads to increased confidence in generation of summary documents or workpapers. The augmented experience delivers valuable insights as to where and how information is retrieved and extracted. As a result, auditors are better equipped to make more informed and thorough risk determinations.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIG. 3 is a chart showing a number of confidence factors corresponding to different levels that are used in the chained confidence module in connection with an automated loan risk assessment according to an exemplary embodiment of the invention.

FIG. 5 is an example of a user interface illustrating grades for a number of loans and an overall confidence value for each grade according to an exemplary embodiment of the invention.

FIGS. 6A and 6B show an example of a user interface illustrating a number of calculated attributes and an associated attribute calculation confidence according to an exemplary embodiment of the invention.

DETAILED DESCRIPTION

Exemplary embodiments of the invention will now be described in order to illustrate various features of the invention. The embodiments described herein are not intended to be limiting as to the scope of the invention, but rather are intended to provide examples of the components, use, and operation of the invention.

Figure 1:
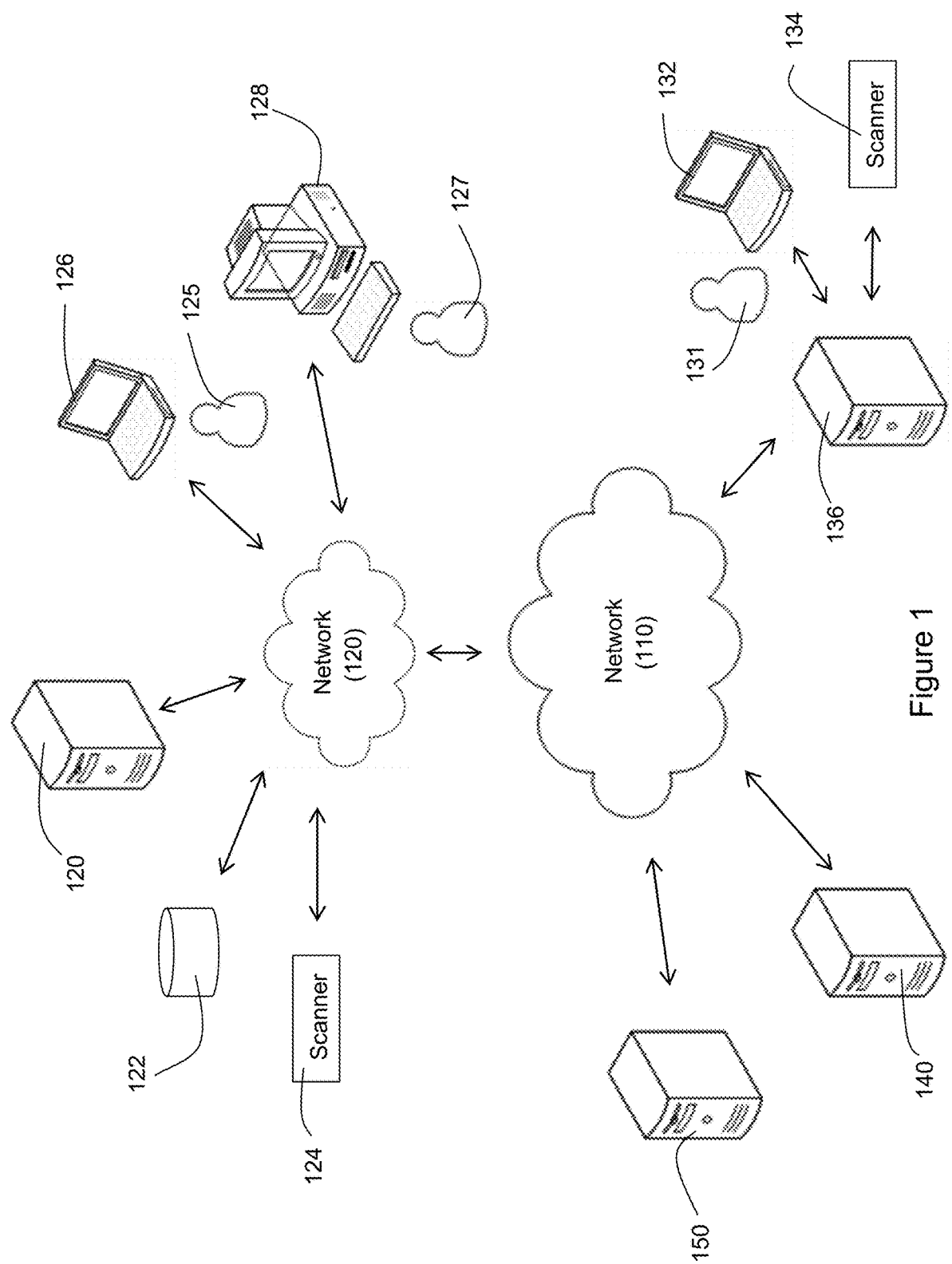
FIG. 1 is a diagram of an automated loan audit system according to an exemplary embodiment of the invention.

According to one embodiment, the invention relates to an automated loan audit system with chained confidence scoring. FIG. 1 is a system diagram showing an example of the loan audit system. As shown in FIG. 1, the system may comprise a server 120 and associated database 122 along with software and data that are used to run the system. The system may also include a scanner 124 used to scan original hard copy documents, such as credit files from a client. The server 120 and database 122 may be used to store the scanned images of original documents, as well as to store any electronic documents in the credit file, software, and other data used to run the system. A user 125 such as a subject matter expert (e.g., commercial mortgage loan auditor) can access and use the system 120, database 122, and scanner 124 through a personal computing device 126, such as a laptop computer, desktop computer, tablet computer, or mobile phone, for example. FIG. 1 also shows an additional user of the system 127, who may be a data scientist or administrator, for example, who accesses the system through a personal computing device 128 such as a desktop computer.

According to one embodiment, the system is owned or operated by an auditing firm which uses the system to evaluate risk in portfolios of commercial mortgage loans held by its bank clients. As shown in FIG. 1, a representative 131 at the client may use a personal computing device 132 and server 136 to store and send credit files to the auditor via a network 110. The credit files may comprise a combination of scanned images of documents and electronic documents, for example. The client may use a scanner 134 to create scanned images of hard copy documents which are then stored in the server 136 and/or personal computing device 132 along with any electronic documents. FIG. 1 also shows third party servers 140 and 150 that may provide the auditor with relevant data on the loans. For example, the auditor may acquire property valuation data from server 140 operated by an appraiser and may acquire credit history data on borrowers from server 150 operated by a credit bureau.

Also shown in FIG. 1 are networks 110 and 120. The networks 110, 120 may comprise any one or more of the Internet, an intranet, a Local Area Network (LAN), a Wide Area Network (WAN), an Ethernet connection, a WiFi network, a Global System for Mobile Communication (GSM) link, a cellular phone network, a Global Positioning System (GPS) link, a satellite communications network, or other network, for example. The other computing devices, e.g., servers, desktop computers, laptop computers, and mobile computers, may be operated by different individuals or groups, for example, and may transmit data such as credit files to the server 120 and database 122 via the networks 110, 120.

Figure 2:
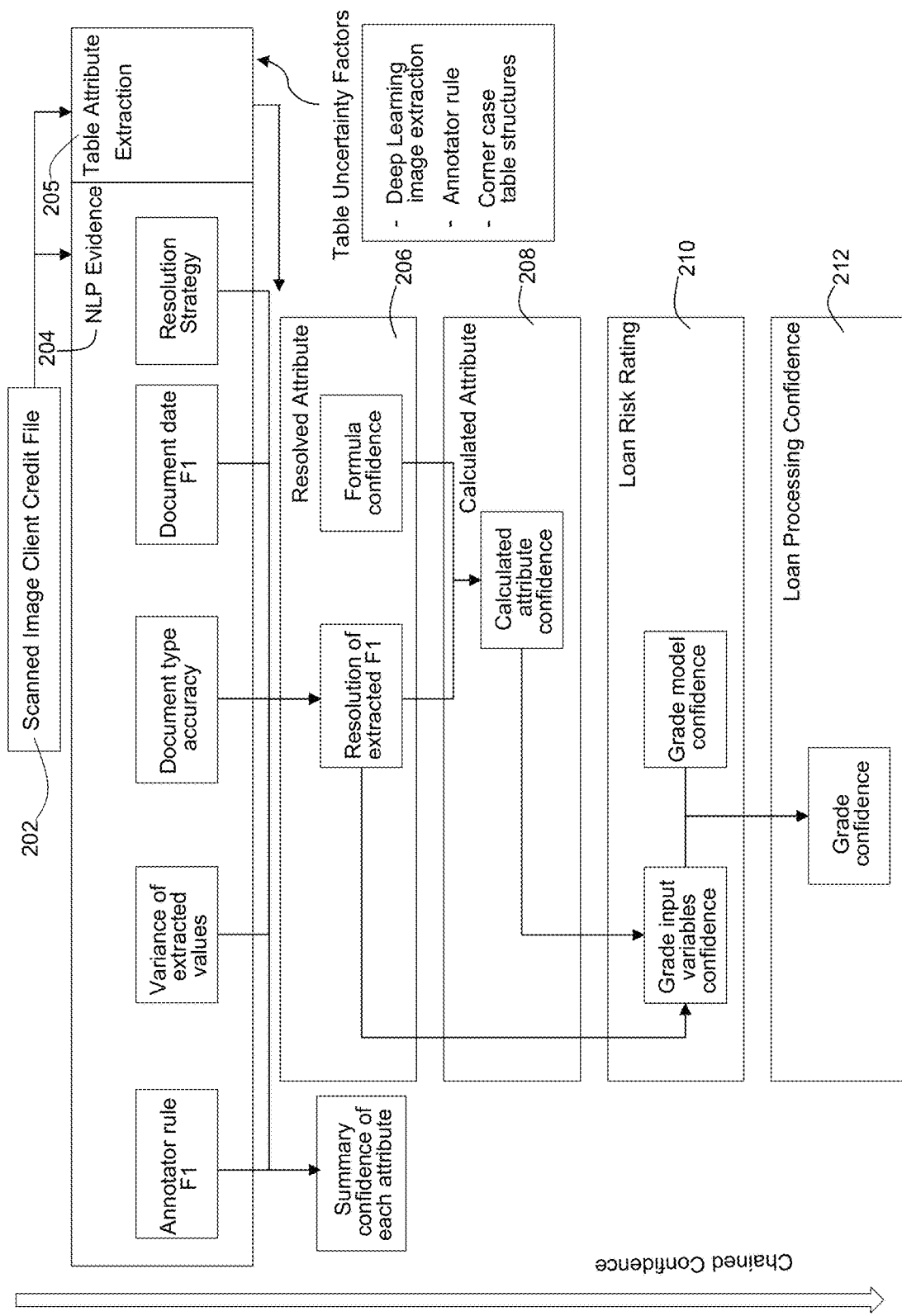
FIG. 2 is a diagram illustrating a process for automated loan risk assessment, including a chained confidence module according to an exemplary embodiment of the invention.

FIG. 2 illustrates a process for automated loan risk assessment with chained confidence scoring according to an exemplary embodiment of the invention. As shown in FIG. 2, the process starts with a scanning step 202 to create an electronic image of original documents in a client credit file. The credit file may include, for example, a promissory note, security agreement, recordation of lien documents, payment history, and other conventional loan documents. The credit file may comprise both hard copy documents that need to be scanned into images, as well as electronic documents that do not need to be scanned. The scanning of hard copy documents in step 202 may be conducted by the client using its scanner 134 or by the auditor using scanner 124. The scanning process 202 will typically utilize optical character recognition (OCR) to convert an image into text characters that can be read and processed by the system. The scanning process may also comprise extraction of attributes from tables in the credit file.

As shown in FIG. 2, the process of automated loan grading comprises a number of cognitive processing tasks. Examples of cognitive processing tasks may include determining a loan origination date, obtaining a value from a table in a loan document, determining a document type for a document within the credit file, and determining a variance of extracted values. According to one embodiment, each cognitive processing task in a defined set of tasks has an associated confidence factor. The confidence factor quantifies the likelihood that the cognitive processing task has been performed correctly and may be expressed as a decimal between 0 and 1 or a percentage, for example.

FIG. 3 illustrates a list of confidence factors 302 that can be used in an automated commercial mortgage loan grading process with chained confidence scoring according to one embodiment of the invention. In operation of the system, each of the confidence factors 302 will have a value according to one embodiment of the invention. As shown in FIG. 3, there are thirteen confidence factors that are used. The confidence factors 302 in FIG. 3 correspond to the cognitive processing tasks shown in FIG. 2.

Referring again to FIG. 2, the cognitive processing tasks and associated confidence factors can be grouped into five levels, according to one embodiment of the invention. As shown in FIG. 2, the first level, NLP Evidence 204, relates to electronically scanning the documents in the credit file and using natural language processing (NLP) to interpret the content of the scanned and electronic documents. Cognitive processing tasks in this level may include an annotator rule F1, determination of the variance of extracted values, documentation type accuracy, document date F1, resolution strategy confidence, and summary confidence of each attribute. F1 scores are a type of accuracy metric that takes into account both the robustness of the technique (the recall) and the correctness of the technique (the precision). It is a good way to demonstrate accuracy for NLP because it considers both how often something was not proposed when it should have been (recall) and how often something was proposed that was incorrect (precision). The calculation for F1 is 2

$$2\left(\frac{\text{precision} \times \text{recall}}{\text{precision} + \text{recall}}\right).$$

Table Attribute Extraction 205 in FIG. 1 refers to an automated cognitive process in which one or more attributes are extracted for a table in a loan document. Within the documents which are provided for a loan risk rating professional, some needed data elements are often contained in tables. Typically, the technical table structure within which the material is provided is not a standard, pre-defined table structure. Thus, a range of IT industry approaches to "table extraction" are used to extract attribute values from a table source. In addition, for tables which are imbedded within a scanned document (as opposed to an electronic document), the technical approaches leverage technically advanced approaches such as deep learning. Every approach to extracting attribute/cell values from a table introduces a "confidence" telemetry factor which the chained confidence mechanism incorporates into the chained confidence model training. As indicated in FIG. 2, examples of uncertainty factors include the aforementioned deep learning understanding of scanned images of a table, annotator rules used by a table data extraction capability, and "corner case" (or, very infrequently seen) technical table structures for which the table extraction capability to be used has not yet been trained to yield a high confidence. Thus, for each table cell value (directly used as an attribute in a loan risk rating calculation, or used as a value in the calculation of a derived attribute value), a confidence value is associated with that "table value extraction" step.

The second level, Resolved Attribute 206, generally relates to cognitive processing tasks for resolution of extracted attribute F1 and formula confidence. Once all possible values are extracted for an attribute, the resolution process applies normalization and resolution to find the best possible value for the attribute. Normalization changes all values to a single format (for example, Jan. 1, 2018 and Jan. 1, 2018 will both be converted to Jan. 1, 2018). Resolution then determines, for example, that if there are five values that normalize to Jan. 1, 2018 and one that normalizes to Jan. 1, 2017, the likely answer is Jan. 1, 2018 (unless the other value comes from a document that has higher priority). These logics are all written and incorporated into the derivation and resolution services in the system, and contribute to the overall interpretation. Confidence of the resolved attributes may be important because not all logics are created equal. For example, there may be some logics that work most of the time, but can fail. In that case, confidence of that resolved attribute is reduced appropriately.

The third level, Calculated Attribute 208, relates to confidence in calculated attributes. Once all extracted attribute values have been normalized and resolved, the derivation and resolution services applies logics and calculations that create values for other calculated attributes. According to one example, there may be a calculated attribute for how many months remain on a lease, and the system has extracted both the lease begin date and the lease end date. A calculation logic is created that determines today's date and applies an algorithm to generate the value for the new calculated attribute based on the previous extracted attributes. However, not all calculations are created equal. Some calculations may be more recall-oriented and imprecise, so the system is designed to calculate how confident it is in a particular calculation (as well as in the attributes that were used as input for the calculation).

The fourth level, Loan Risk Rating 210, relates to grading of input variables confidence and grade model confidence. Each machine learning (ML) model in the system is able to calculate a confidence of how well the model appears to match the test data that is being put in. In addition, a confidence factor can be added for the input variables themselves to the grade model confidence, because while the model is unable to determine the veracity of the attributes that are used as input, the previous iterations of confidence in the system can. This combined confidence provides a more reasonable view of the risk rating itself than the typical machine learning confidence alone.

The fifth level, Loan Processing Confidence 212, relates to the overall loan grade confidence. This confidence is an amalgamation of each of the previous factors, which are combined based on static rules of how much a role each of the engines play in the overall confidence. The static rules determine not only the order in which the confidences are applied, but also the weight of each confidence to the final confidence model.

According to an exemplary embodiment of the invention, the system provides an instance of a cognitive solution in which multiple different cognitive technology solutions are used to perform an analysis of a commercial mortgage loan case. Each cognitive processing task has an associated "confidence value" which quantifies the likelihood that the cognitive processing task has been performed correctly. In addition, the system derives an overall confidence value using the chained confidence methodology described herein.

According to an exemplary embodiment of the invention, the chained confidence module comprises the following elements.

1. The system allows end users (e.g., loan auditors), using actual client credit files and related data, to provide their case feedback, e.g., the ability to change the system-proposed loan risk rating. The system can also calculate and capture the confidence values (e.g., 13 confidence values according to one embodiment, as shown in FIG. 3) associated with the processing of that loan risk rating. When the values are changed by the user, this changes not only how the risk rating is calculated across the different engines, but also enables the system to optimize the rules used to weight each of the confidence factors in the final confidence calculation.

2. This active learning approach generates a body of training data, where the training data is the set of confidence values for each cognitive processing step for each loan case, along with the outcome of that case (score generated was "correct").

3. The body of training data is then used to train a chained confidence model, the end result of which enables calibration/correlation of a chained confidence score (e.g., an overall confidence score for the loan grade) with the correct adjudication of a case. In other words, the approach is to use the chain of confidence scores as features in a model which can be trained, according to one embodiment of the invention.

4. The foregoing process results in a trained chained confidence model that enables the automated processing of commercial mortgage loans and other types of loans, according to one embodiment. The user can auto-accept the system-determined loan risk rating if the chained confidence value is above the calibrated score from step 3 above.

Figure 4:
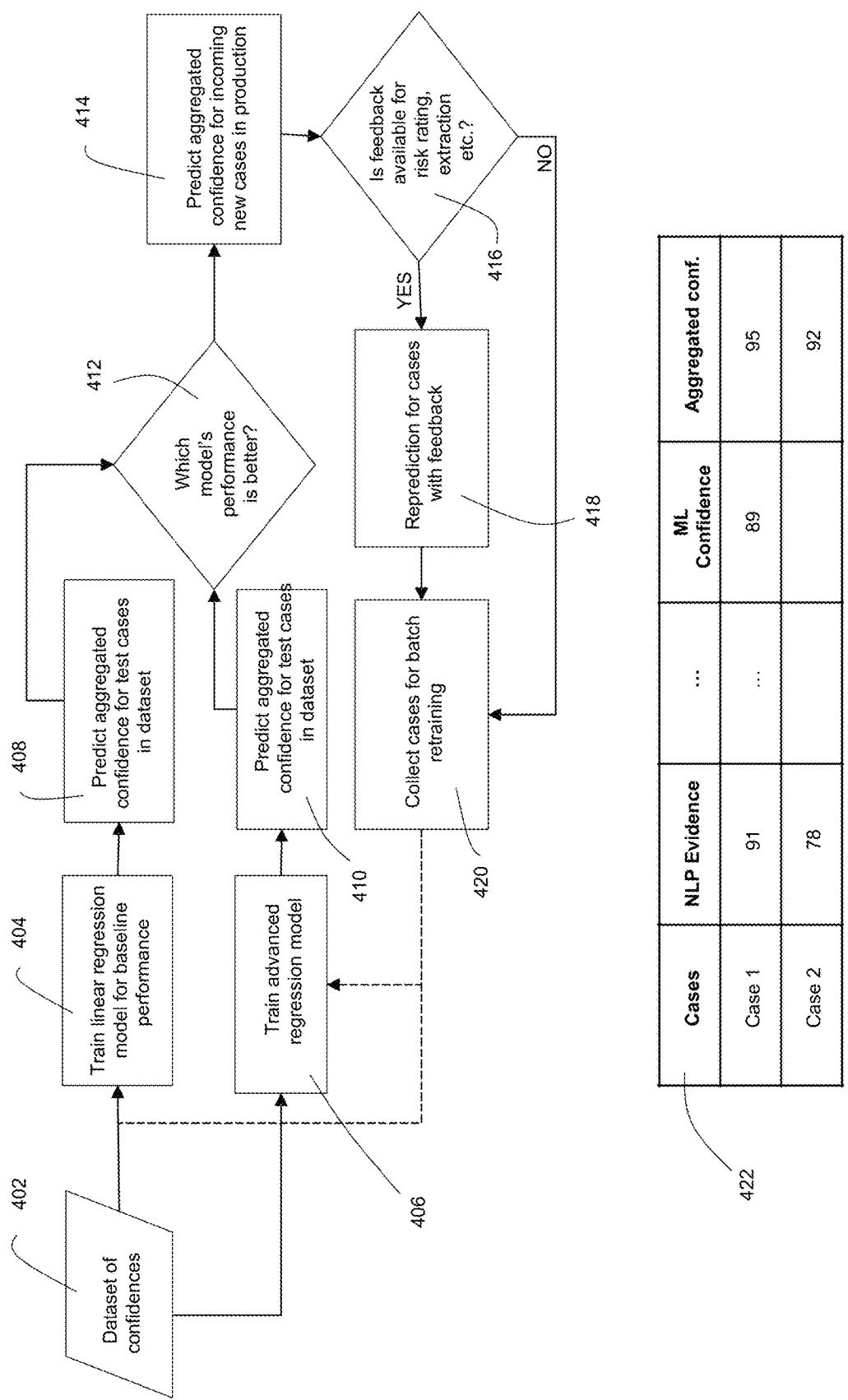
FIG. 4 is a flow diagram illustrating a chained confidence training process according to an exemplary embodiment of the invention.

FIG. 4 is a flow diagram illustrating the chained confidence training process according to an exemplary embodiment of the invention. A statistical learning process needs, at first, a static set of data points that is representative, to a reasonable degree, of the population of examples seen in a real world application. In FIG. 4 at step 402, a similar dataset is curated with the 13 confidence factors previously calculated at various stages of the pipeline. With this dataset, an iterative process is started wherein a set of weights (13 in this example) is to be learnt such that an aggregation of these 13 individual confidence factors will lead to an optimal overall, aggregated confidence score. This iterative process is carried out in both the linear and advanced regression algorithm training stages shown in steps 404 and 406 in FIG. 4. While undergoing this training, statistical parameters are added to the regression model to keep it fair in its learning. This ensures that the model is generalized and accounts for the variability in examples seen in the real world. As shown in FIG. 4, the process starts in step 402 with a dataset of confidences. For example, the dataset may include the 13 confidence values for a particular loan. In step 404, the confidence values are used to train a linear regression model for baseline performance. In step 406, the confidence values are also used to train an advanced regression model. The trained linear regression model is used to predict aggregated test cases in a dataset in step 408. The advanced regression model is also used to predict aggregated confidence for test cases in a dataset in step 410. These two aggregated confidences are compared in step 412 to determine which model has the better performance. In step 414, based on the model with better performance, the system predicts aggregated confidence for incoming new cases in production.

In step 416, the system determines whether feedback is available for the risk rating, extraction, etc. If the answer is yes, in step 418 user feedback can be collected to override the algorithm predictions of confidence if errors are perceived since no algorithm or machine performs at a 100% efficiency. Once this feedback is available, a set of these new cases can be batched for an iteration of training building on the model available in the previous iteration as in step 420. Over time, as new cases are seen more and more and the learning process knows more and more about the real world population, the algorithm performs at incrementally better levels than previous passes of predictions. In step 416, if the answer is no, the cases are collected for batch retraining in step 420. The data is then transmitted to the linear regression model and the advanced regression model for training, and the process repeats.

FIG. 4 also shows a table of confidence factors 422 for a number of loans (Case 1, Case 2, etc.). For example, Case 1 may represent a commercial mortgage loan and the table shows each of the 13 confidence factors and associated values identified in FIG. 3. It also shows the aggregated confidence value, i.e., the overall confidence in the loan grade. As can be seen from the table 422 in FIG. 4, the aggregated confidence value can be higher than the individual confidence values, due to the training of the chained confidence algorithm. The aggregated confidence value may turn out to be higher than the individual confidence values since the final aggregation is a weighted sum of the individual confidence values. How the individual confidences are weighted, i.e., the weights for each term in the sum, are the parameters being learnt in the training process. Through statistical error calculations over many iterations, the combination of weights that provide the least error is retained. This iterative error checking process leads the regression algorithm to learn the weights in a manner that automatically weights the most important confidence factor highly and the least important factor low. This optimal set is retained for future use when and if a new case with the respective 13 confidence factors becomes available, and these retained weights are then applied to arrive at an aggregate confidence for the new case.

FIG. 5 illustrates an example of a user interface for an overall loan confidence factor according to an exemplary embodiment of the invention. Initially, the user (e.g., a professional commercial mortgage loan auditor) can select a particular client (e.g., a bank) to view credit files for that client. The user interface lists the name of each credit file 502, along with the total number of documents 504 in the credit file, the client's grade 506 for the credit file, the auditor's grade 508 for the credit file, and the overall loan confidence 510.

Figure 6A:
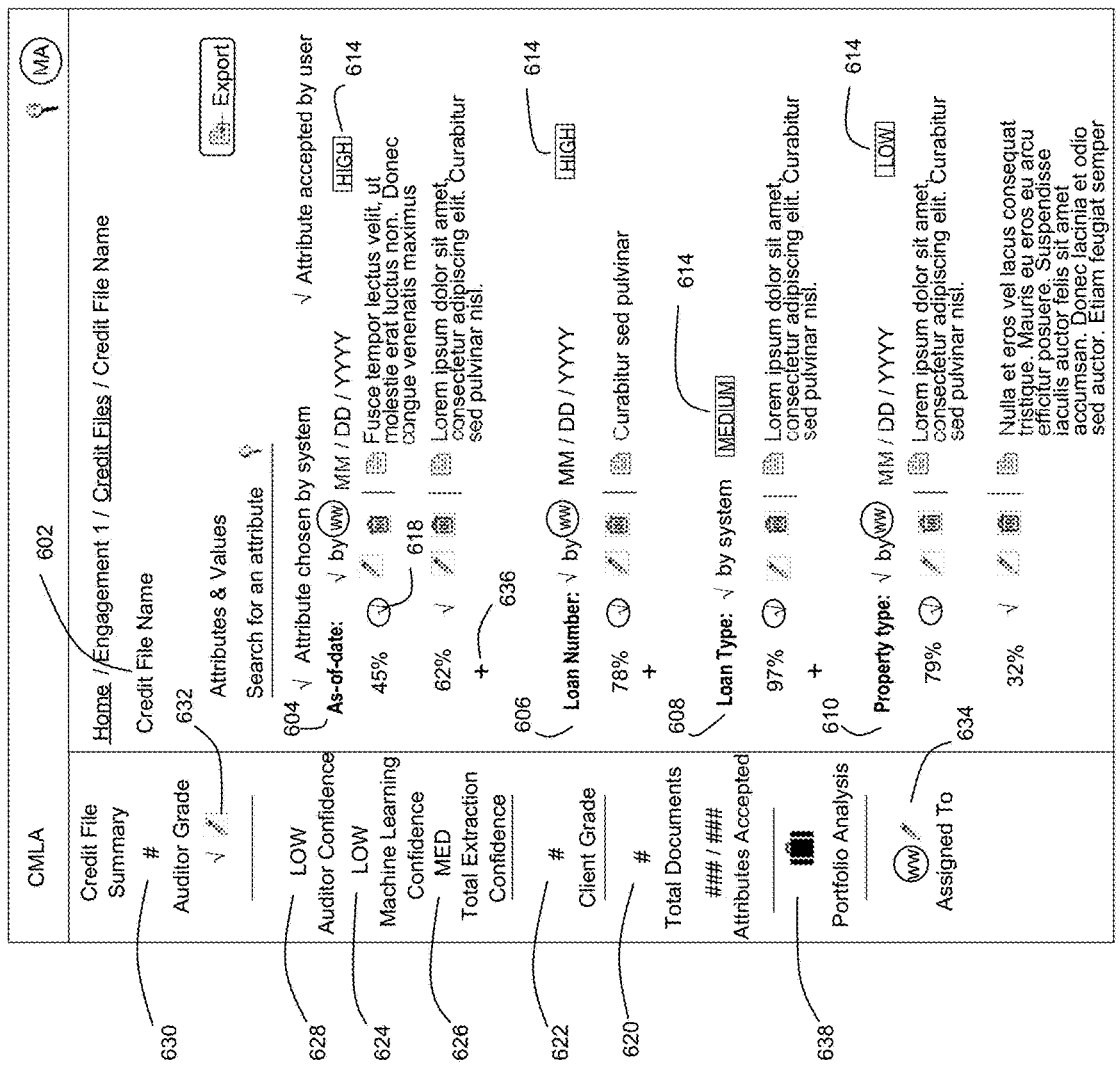
Figure 6B:
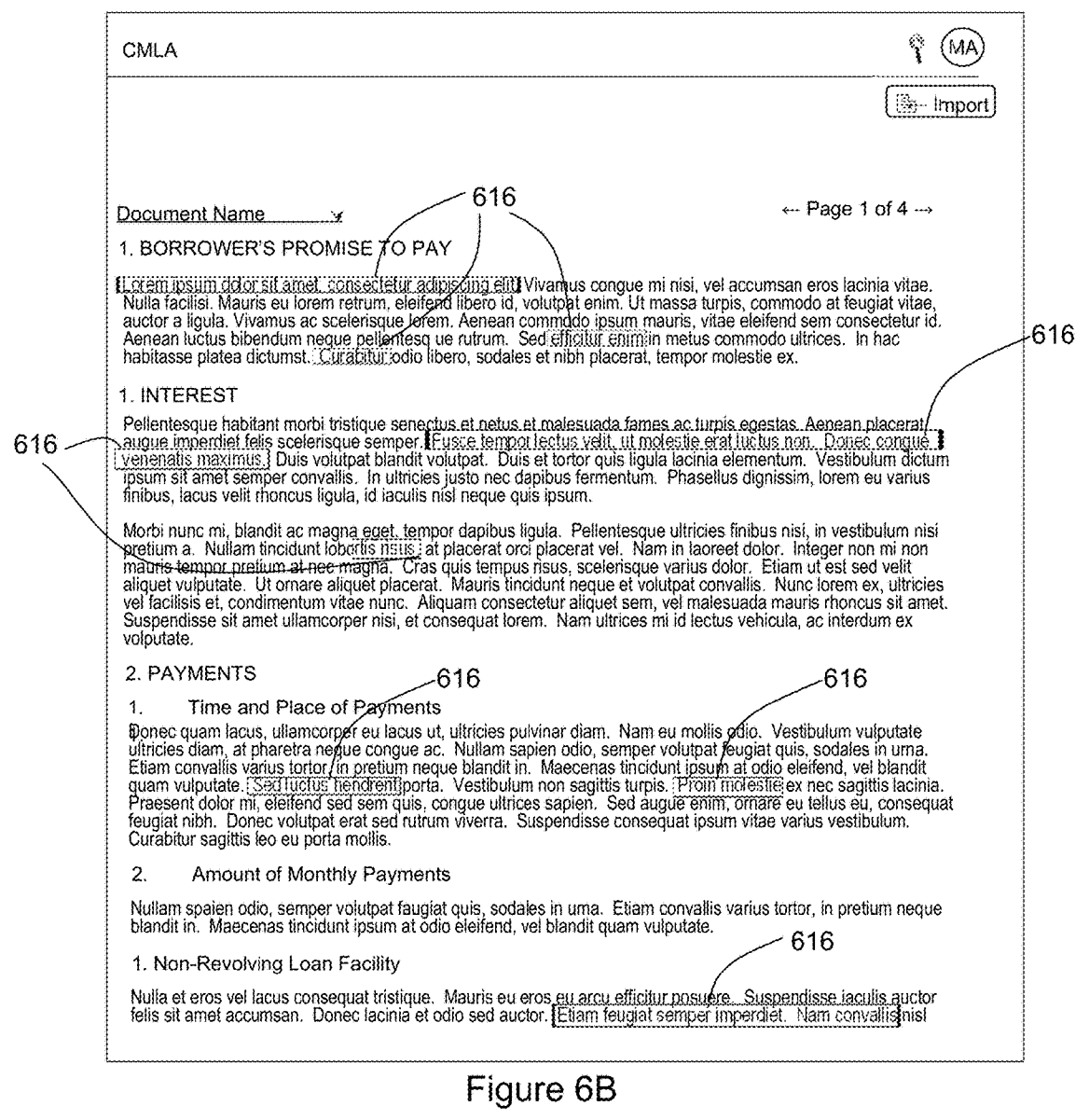

FIGS. 6A and 6B illustrate an example of a user interface for analysis of an calculated attribute confidence. Preferably, FIGS. 6A and 6B are presented side by side on a single computer screen. As shown in FIG. 6A, the user interface presents information on a particular credit file 602 identified in the header. This screen may be accessed, for example, by clicking the credit file name 502 in FIG. 5 for a particular credit file. In FIG. 6A, the credit file 602 is identified, along with information on different attributes for the credit file. For example, regarding loan details, a number of attributes are identified, including an As-of-date 604, a loan number 606, a loan type 608, and a property type 610. For each attribute, there is an attribute calculation confidence 614, which represents a confidence in the calculation of the attribute. As shown in FIG. 6B, there is also a view of the original, corresponding evidence (e.g., the relevant portion of a document in the loan file) with highlighted values 616 that have gone into the attribute calculation. This presentation allows the user to see the evidence from which the attribute was derived. The user interface in FIG. 6A also includes an indication 618 of whether the calculated attribute has been accepted. The user interface also allows the user to manually add values for an attribute by either by selecting "+" (element 636 in FIG. 6A) or by selecting text in the original evidence shown in FIG. 6B.

FIG. 6A also illustrates that the user can view the total number of documents in the credit file 620, client's grade for the loan 622, machine learning confidence 624, total extraction confidence 626, overall loan confidence 628, auditor's grade for the loan 630, and a portfolio analysis button 638. Clicking the analysis button 638 allows the user to view additional details of the analysis involved with grading the loan. Further, the user can accept or manually edit (e.g., by clicking the edit icon at 632) the auditor's grade associated with the credit file, as described further below in connection with FIG. 7. Finally, the user may edit the current assignee for that particular credit file by clicking the icon at 634 in FIG. 6A.

Figure 7A:
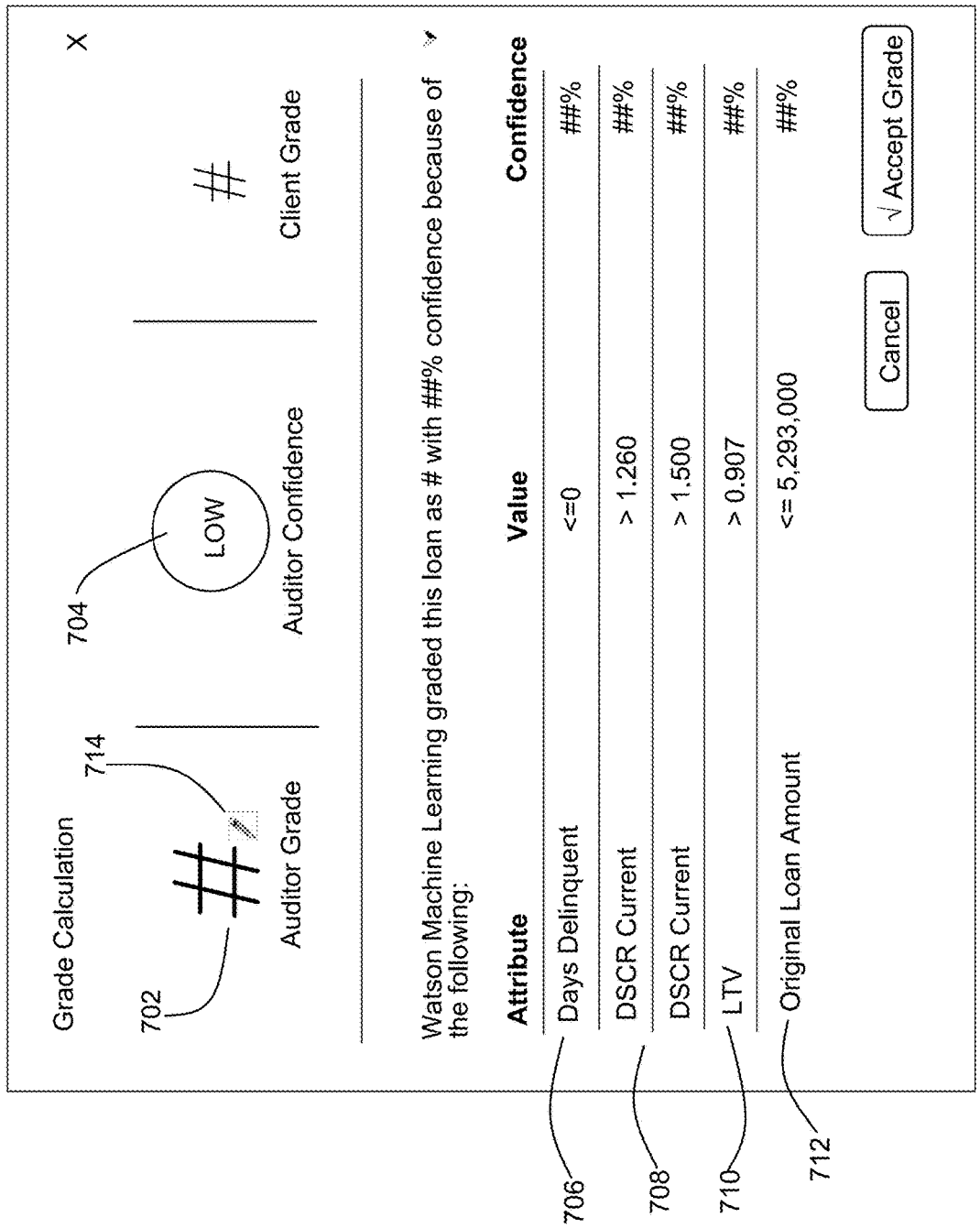
FIGS. 7A and 7B show examples of a user interface illustrating loan grades and associated confidence values according to an exemplary embodiment of the invention.
Figure 7B:
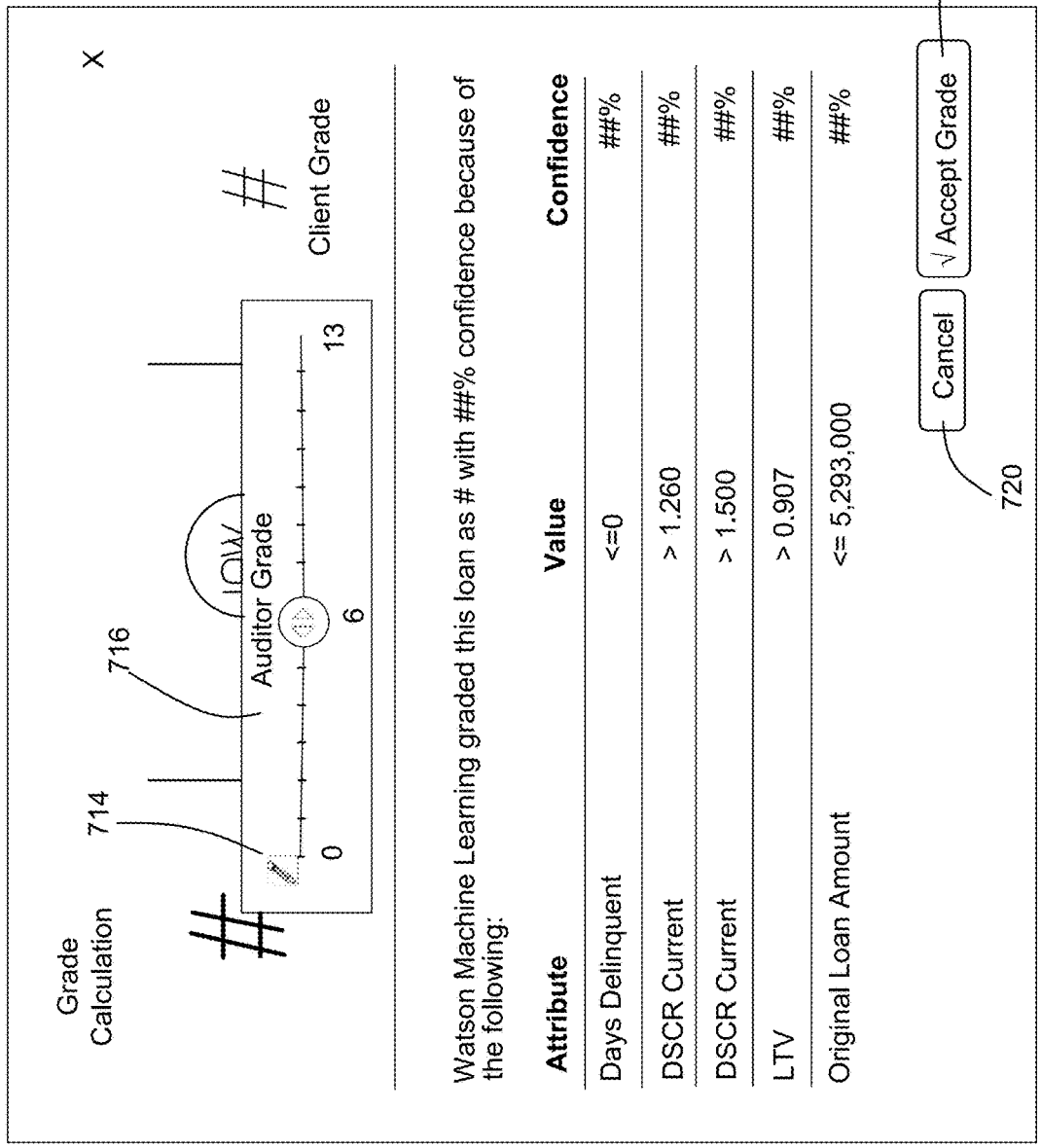

FIGS. 7A and 7B illustrate an example of a user interface for risk rating confidence according to an exemplary embodiment of the invention. As shown in FIG. 7A, the interface shows the auditor's loan grade 702 and auditor confidence 704. It also provides the basis for the auditor's loan grade. In the example shown in FIG. 7A, the basis for the loan grade and confidence cites days delinquent 706, the debt service coverage ratio (DSCR) 708, the loan to value (LTV) 710, and the original loan amount 712. The DSCR 708 represents the cash flow available to pay current debt obligations. The LTV 710 is the loan amount divided by the property value. These values enable the user to evaluate the level of confidence in the loan grade 702. This auditor's grade 702 is also editable via an edit button 714 adjacent to the auditor's grade. Clicking on the edit button 714 provides a slider 716 to change the grade as shown in FIG. 7B. The user is then able to accept the grade by clicking on the Accept Grade button 718 or cancel and close the modal window by clicking on the Cancel button 720, as shown in FIG. 7B.

Figure 8:
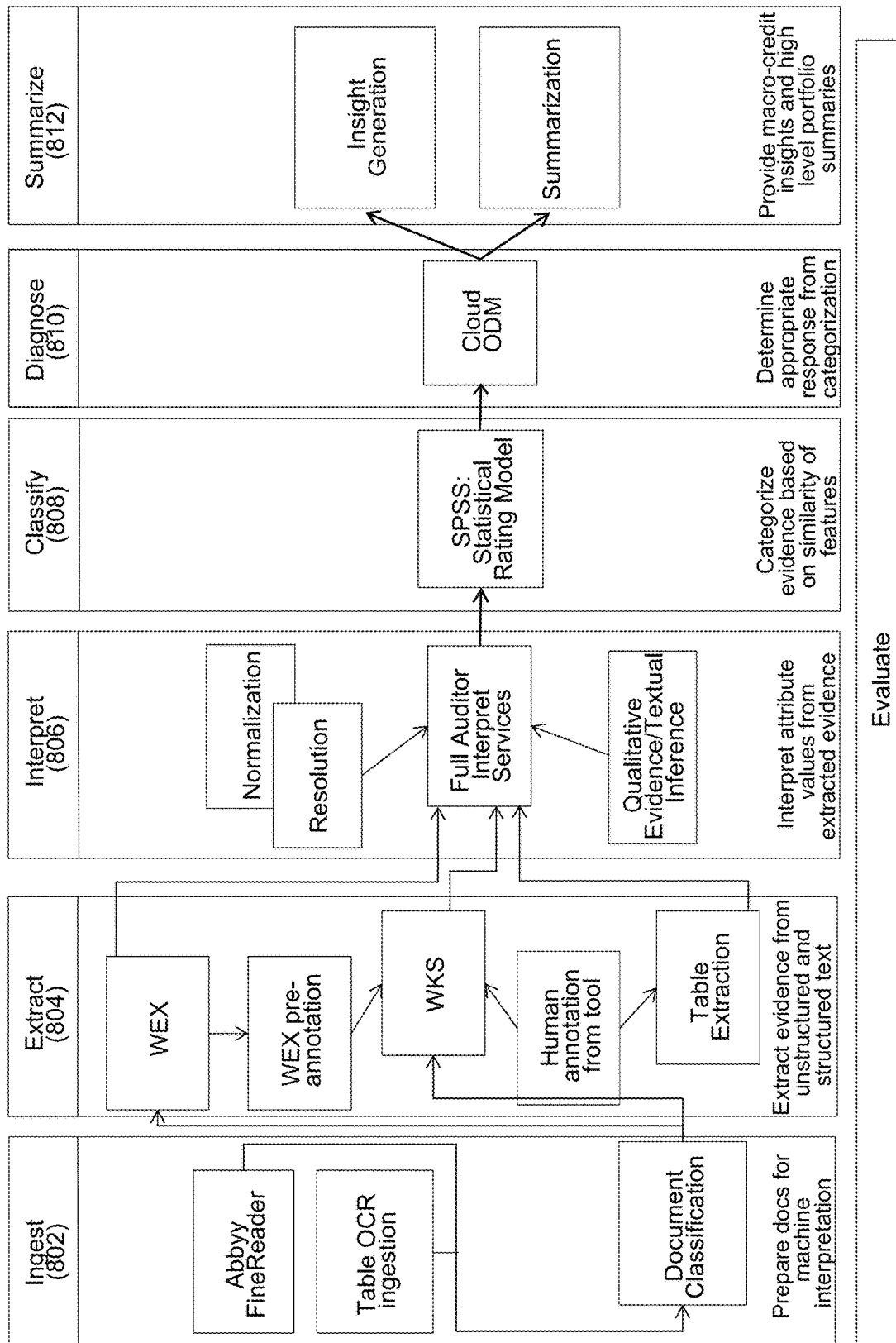
FIG. 8 is a diagram illustrating an example of a deployment architecture for an automated loan auditing system according to an exemplary embodiment of the invention.

FIG. 8 illustrates an example of a deployment architecture for the system according to an exemplary embodiment of the invention. As shown in FIG. 8, the architecture may be divided into various functions, such as Ingest 802, Extract 804, Interpret 806, Classify 808, Diagnose 810, and Summarize 812.

In the Ingest function 802, Abbyy FineReader may be utilized to perform OCR according to one embodiment of the invention. Tables may be ingested with optical character recognition (OCR). Documents may be classified in preparation for extraction. For example, the system may be trained to recognize certain types of loan documents based on their content and format.

The Extraction functionality 804 may involve the use of an extraction module such as WEX (Watson Explorer), WKS (Watson Knowledge Studio), zone-based OCR, and table extraction. Each engine targets separate attributes based on the types of documents and text they are likely to appear in. WEX is a rule-based extraction engine, and therefore works best on attributes that are either fairly static in their text representation, or are so different from client to client that a statistical system is unlikely to learn the pattern from such small data. WKS, on the other hand, does very well on attributes that have a lot of variation within and across clients, and are likely to appear in unstructured text. Table extraction focuses on attributes that appear in tables, and zone-based OCR works well for attributes that appear in forms (such as tax documents). The extract functionality operates to extract evidence from unstructured and structured text.

The next step is the Interpret step 806, which involves interpreting attribute values from extracted evidence. This step includes normalization and resolution. Normalization may involve translating various data points (e.g., dates) initially in different formats, into a common format such as YYYY-MM-DD. Resolution involves adoption of a single value where differing or conflicting values for the same variable are found in the credit file. Qualitative evidence and textual inference may be utilized to provide the full auditor interpret services. The goal of resolution is to take multiple found values for a single attribute and resolve them into a single, most-likely candidate value for that attribute.

Once the attribute values have been interpreted, the Classify step 808 can be executed to categorize evidence based on similarity of features. An SPSS statistical rating model, e.g., as offered by IBM, can be used. This model takes as input the attributes and values found from extracted evidence, as well as a few global values that are deemed to be important to credit risk rating, and uses the values to determine the optimal categorization of the loan into various risk categories. According to one embodiment, the model contains thirteen risk categories, and the classifier is able to distinguish into five broad categories.

The output of the Classify step 808 is input into a Diagnose step 810, which determines an appropriate response from the categorization. A Cloud Operational Decision Manager, such as the IBM ODM (Operational Decision Manager), can be used. ODM incorporates business logics that translate the broad categorizations from the classifier into more granular evidence. ODM is also able to override certain classifications from the machine based on features that might be difficult for the machine to learn at first (for example, if a loan balance is above a certain amount, the loan is always considered risky).

The final step is Summarization 812, which provides macro-credit insights into high level portfolio summaries. This may involve insight generation and summarization. While confidence is not added to this layer, the Summarization step 812 essentially takes the results from the loan risk rating and incorporates external news and events as well as more portfolio-wide information to generate insights for the auditor and the client.

As described in detail above, an embodiment of the present invention is directed to determining credit risk for commercial mortgage loans which generally requires analysis of a large number of documents. An embodiment of the present invention is directed to scaling the inventive aspects of confidence scoring and risk determination to provide expert augmentation for auditors in various applications and use cases.

Independent auditors perform the valuable role of being a trusted intermediary between the providers of business information and the user of that information. High quality, independent audits are essential to maintaining investor confidence. Innovative data analytics and processes are enabling the audit process to become more relevant and valuable. Audit is critical to establishing and maintaining trust in financial information and the overall capital markets systems. Auditors bring independence and objective scrutiny thereby providing business community confidence.

Traditional audit processes provide assurance over the truth and fairness of historical financial information. Auditors are valued because they offer an objective and independent point of view. An embodiment of the present invention is directed to applying innovation to execute improved audits, analyze more data, identify risks/discrepancies and determine new correlations and patterns.

The audit process generally involves a massive amount of documents and evidence of varying type and quality where only a subset is reviewed and analyzed. Usually, the process involves sampling documents in the order of 40 to 1000s of documents. Classifying documents may involve an iterative process that can take 1-4 weeks per engagement per procedure. The subset of documents are reviewed by auditors with varying levels of experience and expertise. This review and analysis then forms the basis of a summary, which is reviewed and relied upon by other members and services. For example, a senior level member may rely on the analysis performed by the auditor, without regard for the underlying documents and evidence. The current process lacks consistency and overall confidence in the audit process.

An embodiment of the present invention recognizes that auditors analyze evidence of varying type and constantly make qualitative determinations throughout the audit process. Due to the high variance in the documents, general machine learning features do not translate well in the audit process from a data science perspective. Accordingly, traditional automation is not suited for the audit process.

An embodiment of the present invention is directed to an Audit Document Investigation Tool that augments the audit process at various stages of an investigation. As a critical component of audit technology initiatives, the Audit Document Investigation Tool provides a consistent, efficient workflow to ingest, automatically prioritize and investigate documents. The innovative tool may be further leveraged by any procedure workflow and linkable to various platforms and systems (e.g., audit engagement workflow applications such as KPMG Clara Workflow (KCW), and other) for full audit trail and subsequent review.

By augmenting the audit process at each stage and enabling auditor interaction, an embodiment of the present invention seeks to prevent missteps and mistakes to accumulate and compound which would generate an end result that would not be reliable. This is likely to occur in a traditional pipeline of automation. With an embodiment of the present invention, the methodology behind each decision will be made available by the system to the auditor and further available for edit/correction during the audit investigation process.

With current systems and methods, manual document ingestion and investigation is a time-intensive process. Generally, thousands of client documents per engagement must be ingested and prioritized for substantive testing. Due to time pressures, constraints and other limitations, only a few documents can be fully investigated by experts, with little transparency across reviews.

An embodiment of the present invention is directed to improving the experience across audit professionals in the audit preparation and review cycles. The innovative system aligns automation and AI capabilities for strategic augmentation. With an embodiment of the present invention, revenue may be preserved through digital transformation thereby reducing the effect of future fee and audit quality pressures. Cost efficiencies are realized by an incremental roll-out that ensures alignment with heaviest pain points and supports a strong path to revenue preservation.

An embodiment of the present invention recognizes that most document review happens within substantive and controls testing, although a significant amount of audit time is spent collecting and reviewing PBCs (Prepared by Client Documents). According to an embodiment of the present invention, the innovative platform allows consistent document review across any document type with no upfront training.

Exemplary document types may include sub-ledger, invoice, confirmation, lease agreement, broker statement, board minutes, sales invoice, derivative type, revenue contract, financial statement, etc. Documents may include unstructured data such as agreements (e.g., loan agreements, lease agreements, expense agreements, general contracts, etc.); semi-structured data such as forms (e.g., tax forms, invoices, sub-ledgers, confirmations, etc.) and mixed data such as statements (e.g., financial statements, broker statements, hedge fund statements, etc.). Consistent review reduces risk and creates quality and control structures around substantive testing and shared services.

An embodiment of the present invention achieves significant efficiencies in labor and resources. As the Audit Document Investigation Tool expands across more document types, efficiencies may be realized to focus on quality and regulatory changes. An embodiment of the present invention achieves revenue preservation. Through smart ingestion and investigation, the Audit Document Investigation Tool builds confidence that audits are more consistent and efficient through strategic key performance indicators (KPI) (number of hours, reduced inspection findings, etc.).

Figure 9:
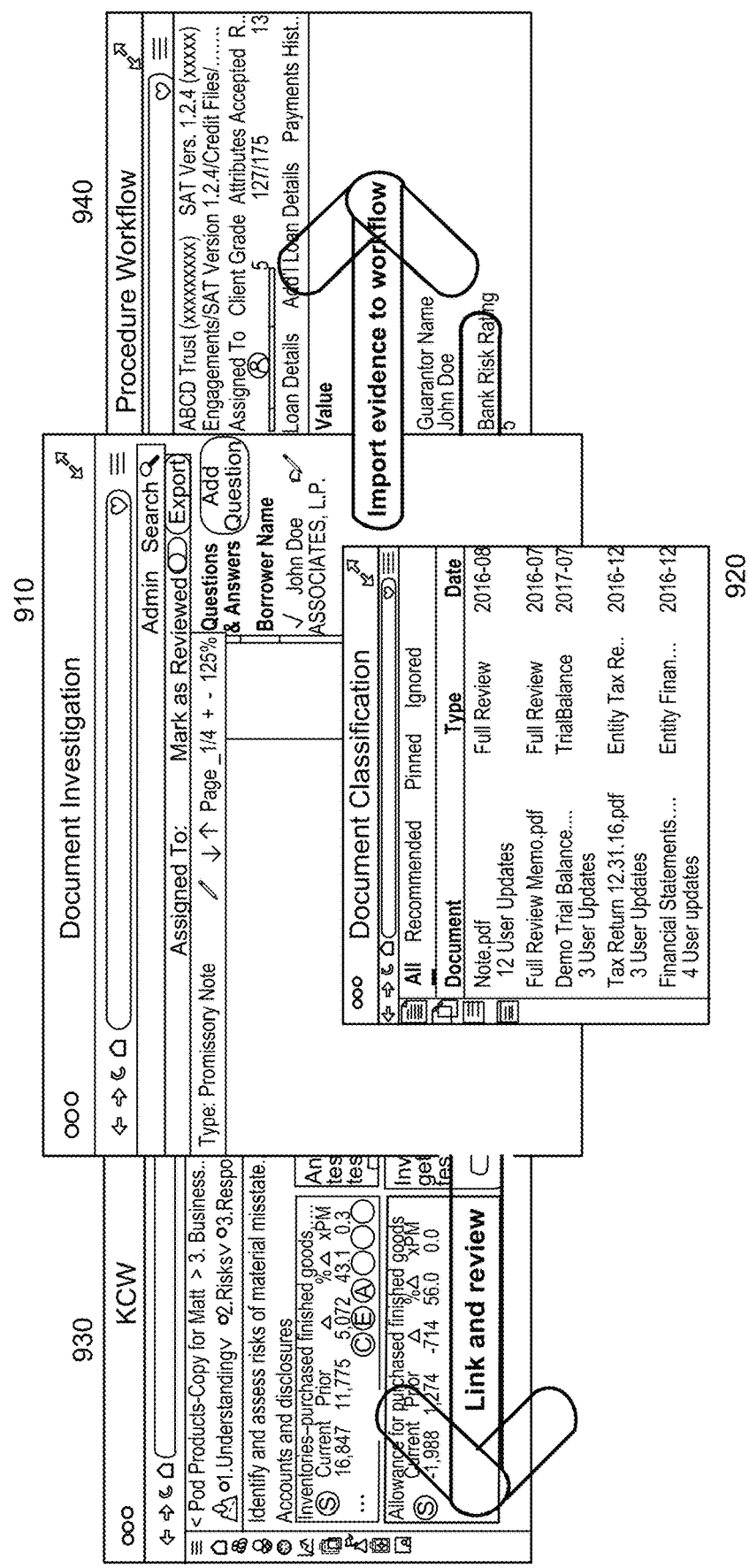
FIG. 9 is an illustration of an Audit Document Investigation Tool, according to an embodiment of the present invention.

FIG. 9 is an illustration of an Audit Document Investigation Tool, according to an embodiment of the present invention. The Audit Document Investigation Tool (DIT) provides a consistent, efficient workflow to ingest, prioritize, and investigate documents, leverageable by any procedure workflow, and linkable to other platforms and systems (such as KCW) for full audit trail and subsequent review. The Audit Document Investigation Tool provides document investigation features illustrated by 910 and document classification features illustrated by 920. This leads to more accurate prioritization and investigation of documents necessary for review. The Audit Document Investigation Tool may be integrated with KCW 930 that allows for linkage and review in an audit platform, such as KPMG's Clara that facilities seamless and transparent interactions through a secure platform that offers a centralized portal. This provides a more efficient consolidation of references for documented risk areas. In addition, the Audit Document Investigation Tool may import evidence to a procedure workflow 940 which enables efficient workpaper compilation and review.

An embodiment of the present invention is directed to generating a risk analysis (e.g., risk rating) as well as a workpaper (or other summary of the investigation process). For example, the workpaper may demonstrate evidence and support for each procedure. As shown in FIG. 9, the workpaper may be imported into an audit platform (such as KPMG's Clara) and provided as part of the audit process. Accordingly, an embodiment of the present invention is directed to augmenting audit evidence as well as the entire audit process and other information that will be provided to clients, regulators, other entities, etc.

As shown by 930, the Audit Document Investigation Tool may be integrated with an audit platform that provides an exchange of important information including valuable insight into the status of audits. The audit platform may also maintain advanced, predictive analytics capabilities within a cloud-based source and seamlessly adopts the latest cognitive and AI solutions. This brings a greater range and depth of insights into risks and anomalies that uncovers meaningful patterns across businesses at a deeper level.

An embodiment of the present invention provides improved scalability. For example, the system may scale capabilities through a foundational platform for smart ingestion, prioritization, and investigation tooling that allows for fast hypothesis-testing of multiple machine recommendations. Each machine recommendation may be considered a hypothesis with supporting evidence that a human can accept or reject. Scalability may also be achieved through use cases by scaling from common audit needs so various users and business units can benefit. In addition, automation may be scaled through incremental technology augmentation from usage data.

An embodiment of the present invention may be expanded by deploying use cases, incorporating user feedback, and prioritizing integrations and add-ons. Incorporating machine learning technologies promotes risk assessment and automatically-deployment of use cases.

According to an embodiment of the present invention, an exemplary system may include functions and features relating to: Digitized Review; Containerization; Consistent Workflow; Low Cost of Entry; Intelligent Assistance and Virtuous AI Cycle. Digitized Review provides digital evidence-finding to support conclusions across documents/ procedures. Containerization provides a scalable platform made up of a suite of containerized components, deployable on-premise or on the cloud. An embodiment of the present invention achieves a Consistent Workflow, from initial to subsequent reviews, with full audit trail of evidence. With the innovative system, there is a low cost of entry. The system may connect any procedure workflow to begin gathering data through use. Intelligent Assistance provides intelligent search, extraction, and business logic interpretation augment information-finding. With a virtuous AI cycle, an embodiment of the present invention achieves a complete audit trail that allows data scientists to track from decisions to their underlying evidence, leading to enhanced confidence and trust.

Figure 10:
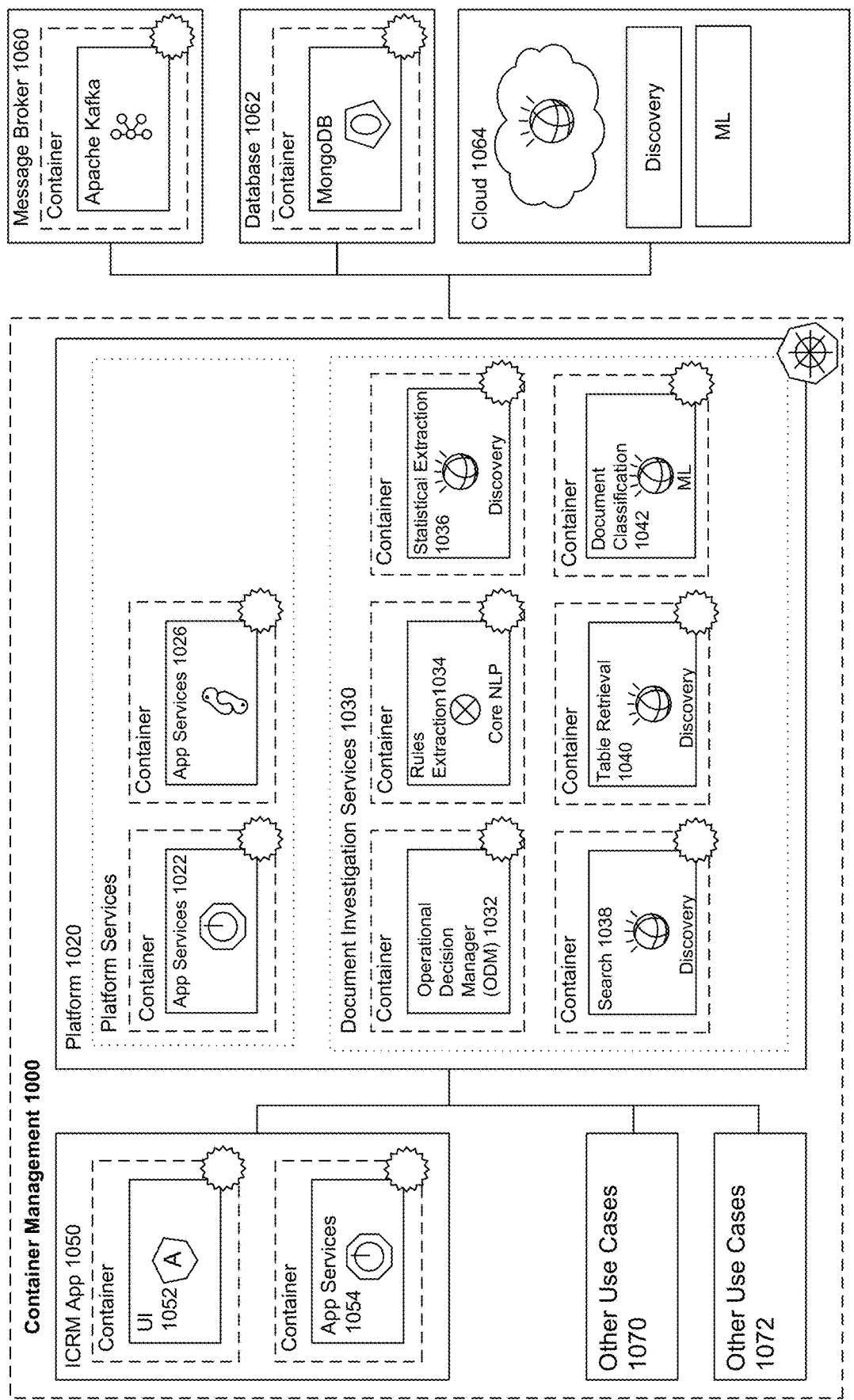
FIG. 10 illustrates containerized components of the Audit Document Investigation Tool, according to an embodiment of the present invention.

FIG. 10 illustrates containerized components of the Audit Document Investigation Tool, according to an embodiment of the present invention. An embodiment of the present invention is directed to an innovative platform 1010 that provides Platform Services 1020 and Document Investigation Services 1030 within a Container Management 1000. Platform Services 1020 may support Containers and App Services 1022, 1024. Document Investigation Services 1030 may include a set of containers that provide Operational Decision Manager 1032, Rules Extraction 1034, Statistical Extraction 1036, Search 1038, Table Retrieval 1040 and Document Classification 1042. Container Management 1000 may support iCRM Applications 1050, including UI 1052 and App Services 1054. For example, iCRM scales commercial mortgage loan review to credit risk. Other functionality may include Message Broker 1060, Database 1062, Cloud Services 1064 as well as support for various use cases and applications, represented by 1070, 1072.

The exemplary systems may be implemented in a variety of ways. Architecture within the exemplary system may be implemented as hardware components (e.g., module) within one or more network elements. It should also be appreciated that architecture within the system may be implemented in computer executable software (e.g., on a tangible, non-transitory computer-readable medium) located within one or more network elements. Module functionality of architecture within system may be located on a single device or distributed across a plurality of devices including one or more centralized servers and one or more mobile units or end user devices. The architecture depicted in system is meant to be exemplary and non-limiting. For example, while connections and relationships between the elements of system are depicted, it should be appreciated that other connections and relationships are possible. The system described below may be used to implement the various methods herein, by way of example. Various elements of the system may be referenced in explaining the exemplary methods described herein.

Figure 11:
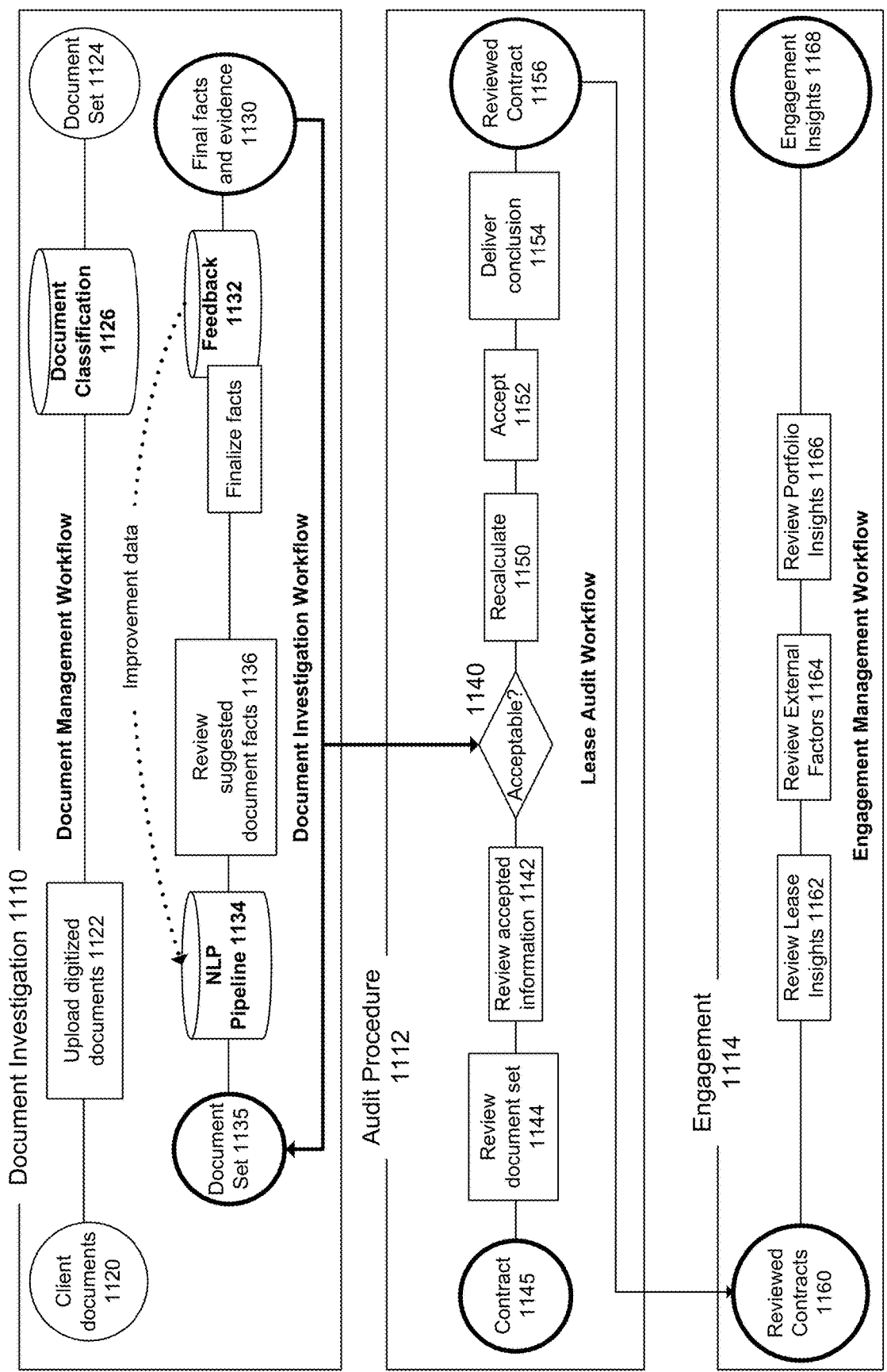
FIG. 11 illustrates an exemplary platform, according to an embodiment of the present invention.

FIG. 11 illustrates an exemplary platform, according to an embodiment of the present invention. An embodiment of the present invention supports Document Investigation 1110, Audit Procedure 1112 and Engagement 1114. The document investigation functionality may be accessible by any audit procedure workflow within KCW. In the document management workflow, client documents 1120 may be uploaded, as shown by Upload Digitized Documents 1122. Document Set 1124 may be classified and managed by Document Classification 1126. Final facts and evidence 1130 may be used as feedback (stored and managed by 1132), as shown by Improvement Data, to NLP Pipeline 1134. Final facts and evidence 1130 may also be managed as Document Set 1135. Facts may be finalized and the system may review suggested document facts at 1136. As shown by Document Investigation Workflow, data may forwarded to an Audit Procedure 1112.

Lease Audit Workflow may determine whether final facts and evidence are acceptable at 1140. If yes, the accepted information may be reviewed at 1142 and the document set may be reviewed at 1144 and represented as Contract 1145. If the data is not acceptable, the system may recalculate the information at 1150, accept the information at 1152 and then deliver a conclusion at 1154 as a Reviewed Contract, shown by 1156.

As part of the Engagement Management Workflow, the Reviewed Contracts 1160 may be analyzed for lease insights at 1162, external factors at 1164 and portfolio insights at 1166. Engagement Insights may be represented at 1168.

Figure 12:
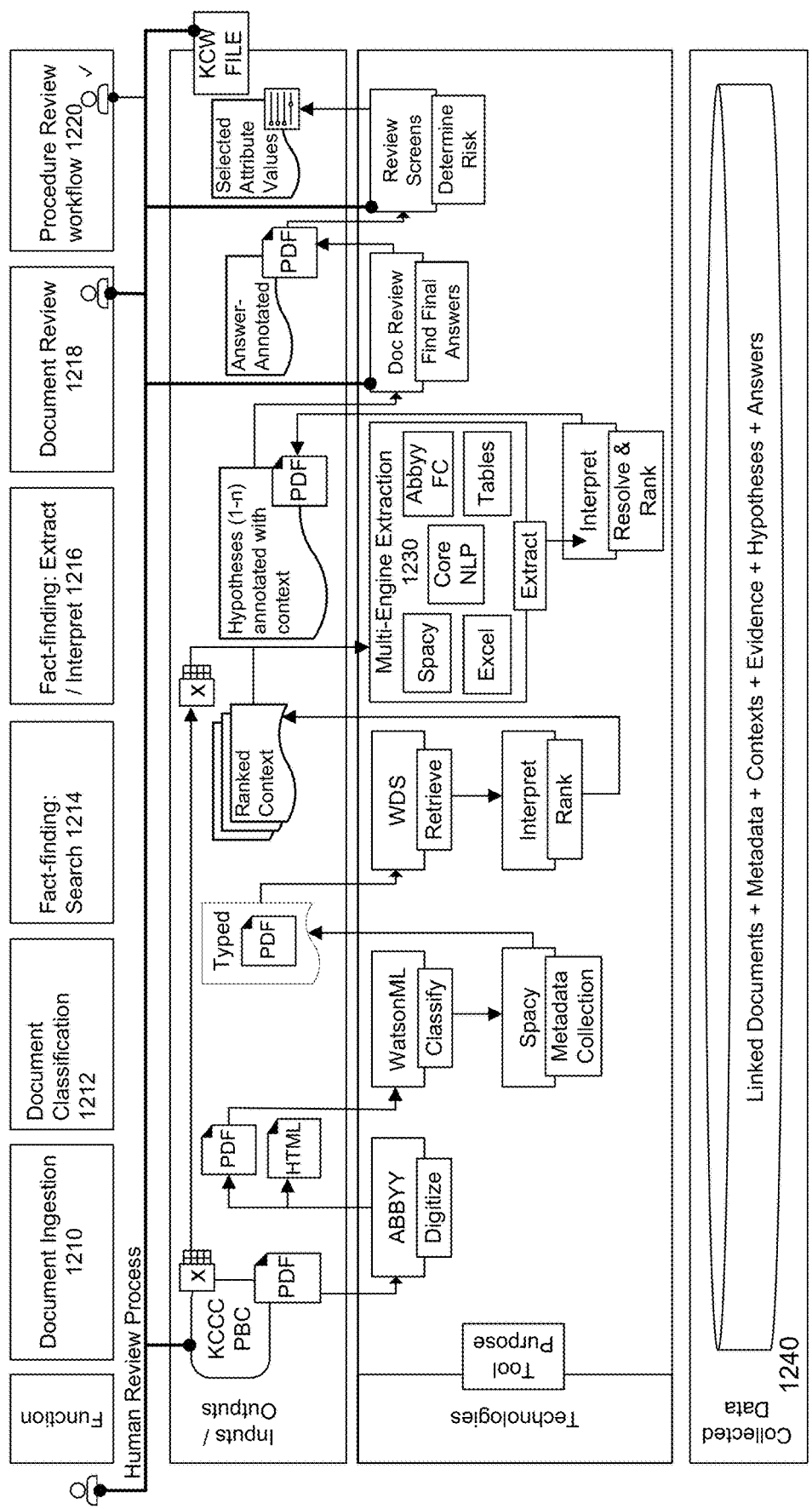
FIG. 12 illustrates an exemplary process flow with augmentation, according to an embodiment of the present invention.

FIG. 12 illustrates an exemplary process flow with augmentation, according to an embodiment of the present invention. As shown in FIG. 12, functions may include Document Ingestion 1210, Document Classification 1212, Fact-Finding: Search 1214, Fact-Finding: Extract/Interpret 1216; Document Review 1218 and Procedure Review Workflow 1220.

An embodiment of the present invention is directed to a platform with a collection of engines, workflows and data processing models. An embodiment of the present invention may upload one or more documents, digitize the documents (e.g., image, text and data capture, etc.), convert to data elements and text into a machine readable format, process the documents, classify the documents (e.g., tax return, mortgage statement, receipt, etc.) and execute through a retrieval/extraction process.

As shown in FIG. 12, Document Ingestion 1210 digitizes documents and prepares the data for processing. At Document Ingestion 1210, documents in various formats may be digitized, including in PDF, HTML, etc.

Document Classification 1212 classifies document types and prioritizes by metadata values. The digitized documents may be classified and metadata may be collected. An embodiment of the present invention may apply a standardized collection process. The data may then be available for various use cases to take the collected data and then translate it into business specifics. Document Classification 1212 may involve examining documents and identifying attributes to accurately classify a document or set of documents. This may involve examining the document type, internal date, key terms and attributes. Document classification may also enable users to prioritize documents and identify which documents to analyze. This may be supported through an interactive interface.

Fact-Finding: Search 1214 retrieves relevant contexts. Fact-Finding: Extract/Interpret 1216 extracts fact values. Fact-Finding may involve data retrieval and ranking. The ranked content may be provided to Multi-Engine Extraction 1230, which may include modules such as Spacy, Excel, Abbyy FC, Tables and Core NLP. The extracted data may be interpreted, resolved and ranked. The system may apply the data to multiple hypotheses (1-$n$), which may be annotated with their context within documents as well as additional evidence. Document Review 1218 corrects and/or confirms hypotheses and evidence. The results may be provided to Document Review 1218 to general a final set of answers. Procedure Review Workflow 1220 provides insights from internal and external data. For example, Procedure Review Workflow 1220 may analyze selected attribute values and determine risks. The collected data may be maintained at 1240. This may include linked documents, metadata, contexts, evidence, hypothesis and answers.

As shown by 1214, the Fact-Finding process may include a search functionality. An embodiment of the present invention may perform a search to identify a subset of information that likely contains the relevant information. For example, this may involve executing a search and then caching the results to optimize the extraction process. An embodiment of the present invention recognizes that there is a large number of documents with high variability in the audit process. The system applies a search function to the document space to reduce the relevant documents. For example, the search may be applied to some or all attributes. This facilitates the extraction process by narrowing the space and data to extract from. The search feature may be used to identify the closest data from where the value likely resides. An embodiment of the present invention may search snippets from search results and identify attributes, such as borrower name, loan amount, etc.

An embodiment of the present invention may apply a ranking engine to prioritize relevant documents. Because of the large number of documents and recognizing that some of the documents may not have been digitized appropriately, the search and ranking process may be applied to confirm extractions through supporting evidence and analysis.

In addition, the search functionality may be configurable. For some attributes, the system may search across all the documents. For other attributes, the system may search a subset of documents, such as a specific document type. For example, a certain attribute may be particularly relevant or specific to tax receipts. In this example, the search may be limited to this type of document.

An embodiment of the present invention provides a document investigation framework, that enables users to interact with the system during a document investigation stage. For example, an embodiment of the present invention may augment the audit process by identifying certain terms and/or attributes while the auditor examines a set of documents. In this example, the system may identify a borrower name. The auditor may correct this attribute through an interactive interface and perform an investigation. In addition, the auditor may confirm and/or compare the identified borrower name with other evidence and information that is readily available to the auditor. An embodiment of the present invention may take the user directly to the underlying or supporting document. This promotes efficiency and further simplifies the attribute extraction process and enables timely corrections and edits during the audit investigation process.

By implementing a search engine for attribute extraction, an embodiment of the present invention may provide multiple recommendations for an attribute. For the attribute "borrower name," an embodiment of the present invention may provide multiple recommendations, such as 3 or 4 possible terms. The auditor may access and analyze supporting evidence for each of the recommendations and then identify the correct term.

By augmenting the audit process, an embodiment of the present invention enables auditors to navigate and find content faster and more reliably. Current systems require auditors to manually review the corresponding documents in a linear manner. As auditors review the documents, an embodiment of the present invention enables elements to be analyzed within context. Augmenting the auditor's investigation process facilities fact finding within documents to bolster arguments and determinations which leads to generation of highly accurate summary documents or workpapers.

An embodiment of the present invention provides an augmented experience that delivers valuable insights as to where and how information is retrieved and extracted. This enables the auditor to make a more informed and thorough risk determination based on the relevant information presented as well as the augmentation generated by an embodiment of the present invention. This further builds auditor confidence and provides understanding as to where the data came from and how the data is used in context. For example, an auditor may be directed to where supporting information and evidence may reside during the investigation process in a timely manner. In addition, auditors may navigate through documents and portions of documents more naturally, quickly and more strategically (as opposed to a linear approach).

An embodiment of the present invention recognizes that there is a high variance with how auditors, of varying experience and expertise, approach the process. The audit process and extracted attributes (e.g., 50 attributes to 200 or more attributes) may depend on various factors including supporting and contradicting information across various documents.

An embodiment of the present invention is directed to aiding and supplementing an auditor's investigation, analysis and determination. The system may identify a set of attributes and then direct the auditor to documents and portions/excerpts of documents that provide the supporting information. In addition, an embodiment of the present invention may identify and retrieve supporting information as well as contradictory information. The system may recognize that an attribute, such as a borrower's name, matches across 6 documents but not in 1 document. Through an interactive interface, the supporting information as well as contradictory information may be provided. An embodiment of the present invention does not simply find the right answer but also provides the supporting information and evidence and further enables an auditor to accept or modify the findings.

An embodiment of the present invention recognizes that audit procedures can vary greatly. For the same documents, different procedures and analysis may be involved. For example, an auditor may apply a substantive testing procedure as opposed to a control procedure. Auditors may reperform the work that the audit client has done (substantive testing), or perform testing to ensure that proper controls are in place across examples (controls testing). Both types may require document investigation, but the purpose and results may vary greatly. For example, investigations of the same sets of documents may find failures in controls but pass substantive testing. This may involve determining whether an entity followed the right set of steps, as opposed to understanding a specific framework. Accordingly, the same investigation may be used differently in terms of how information is retrieved and used in the procedure itself.

In the audit process, there is a high volume of documents with a variety of documents and variety of procedures. Auditors have different skill levels, expertise, roles and even approaches to investigations. The documents may be of varying types, formats, etc. An embodiment of the present invention is directed to a platform that handles various scenarios across a set of documents. Within the audit process, it is generally difficult to predict and therefore difficult to apply traditional methods for automation. For example, a procedure may highly rank a particular attribute and the same attribute may be ranked low in a different procedure. Accordingly, the system may be configurable to address various procedures and applications. In addition, with the audit process, there is variation on how to configure workflows. This is because the nature of understanding may vary by use case even though the same documents apply. Unlike other systems, the innovative system is not catered to a specific use case.

An embodiment of the present invention more thoughtfully integrates human and machines in an investigation process. Feedback may be used to build trust and confidence. This approach provides a more extensible methodology where trust may be extended to auditors, regulators, oversight committees, security risk teams, etc.

Figure 13:
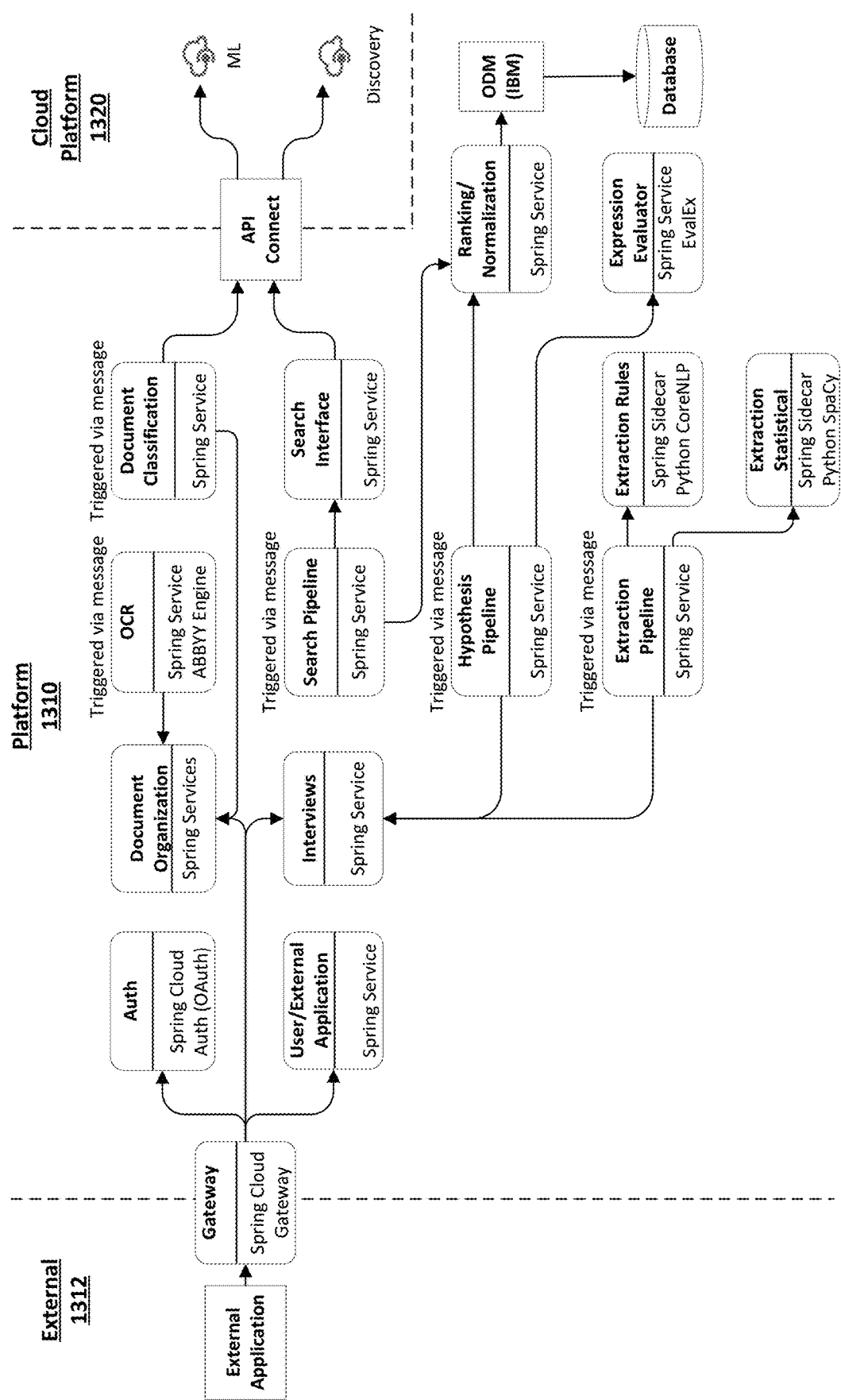
FIG. 13 is an exemplary platform architecture, according to an embodiment of the present invention.

FIG. 13 is an exemplary platform architecture, according to an embodiment of the present invention. Platform 1310 may interact with external applications and/or sources of data, as shown by External 1312, through a Gateway. Platform 1310 may also interact with backend systems, such as a Cloud Platform 1320, via API Connect. In this exemplary illustration, Cloud Platform 1320 provides machine learning and discovery features.

Platform 1310 may identify and authenticate a user via an Authentication ("Auth") and User/External Application. Document Organization and Interviews are supported. Document Organization may be supported by OCR and Document Classification. Extraction features may be supported by Extraction Pipeline, Extraction Rules and Extraction Statistical. Search features may be provided by Search Pipeline and Ranking/Normalization. Document Classification and Search Interface (e.g., Watson Discovery Service (WDS) Interface) may interface with API Connect. Hypothesis Pipeline may integrate with Ranking/Normalization and Expression Evaluator. The results of Ranking/Normalization may be stored and managed by ODM and database (e.g., an object relational database, such as Postgres DB).

An exemplary procedure workflow may involve searching for terms within a document, a subset of documents or all of the documents. The searching feature may be designed to narrow the space or corpus of documents. With a conventional process, an auditor may not know where to start. In this scenario, the auditor may make inquiries of the system. An embodiment of the present invention may generate a methodology of investigation. In addition, the innovative system may analyze a set of documents to collect evidence and then funnel the evidence into a procedure workflow.

An embodiment of the present invention may be utilized by auditors of varying experience and level. For a more experienced auditor, the process may start directly in a subset of documents. In this example, the documents may be uploaded and then classified (e.g., tax return, appraisal, etc.). This enables the auditor to start with any path desired. During the investigation portion, an embodiment of the present invention may identify relevant documents and/or portions of documents that contain and support certain attributes, such as borrower name, loan amount, etc. This illustrates how the attributes are used within context and how such terms are related.

While in an investigation mode, an embodiment of the present invention may provide results and context from documents and supporting evidence. For example, the attribute "borrower name" may exist in a current document, such as a promissory note. The system may identify and make available additional supporting evidence found in other documents. This process builds confidence in attribute identification which is critical for the audit process. Accordingly, an auditor may identify an attribute and access other documents that support the identification, which provides assurances that the attribute has been correctly identified.

An embodiment of the present invention may also provide details concerning the supporting evidence so that the auditor may discern the strength of correctness and accuracy. For example, the supporting evidence may show 7 instances of support in 4 documents. An embodiment of the present invention may also provide alternate or other potentially correct extractions. This enables the auditor to move easily between documents to determine accuracy and applicability. An embodiment of the present invention maintains links to evidence to support an auditor's investigation in tracking evidence and supporting decisions/determinations. This improves the quality and integrity of the investigation.

An embodiment of the present invention recognizes that having proper context provides confidence and enhances the quality of the investigation. In addition, during the investigation, an auditor may easily identify and share information to other team members and recipients for analysis and context.

Figure 14:
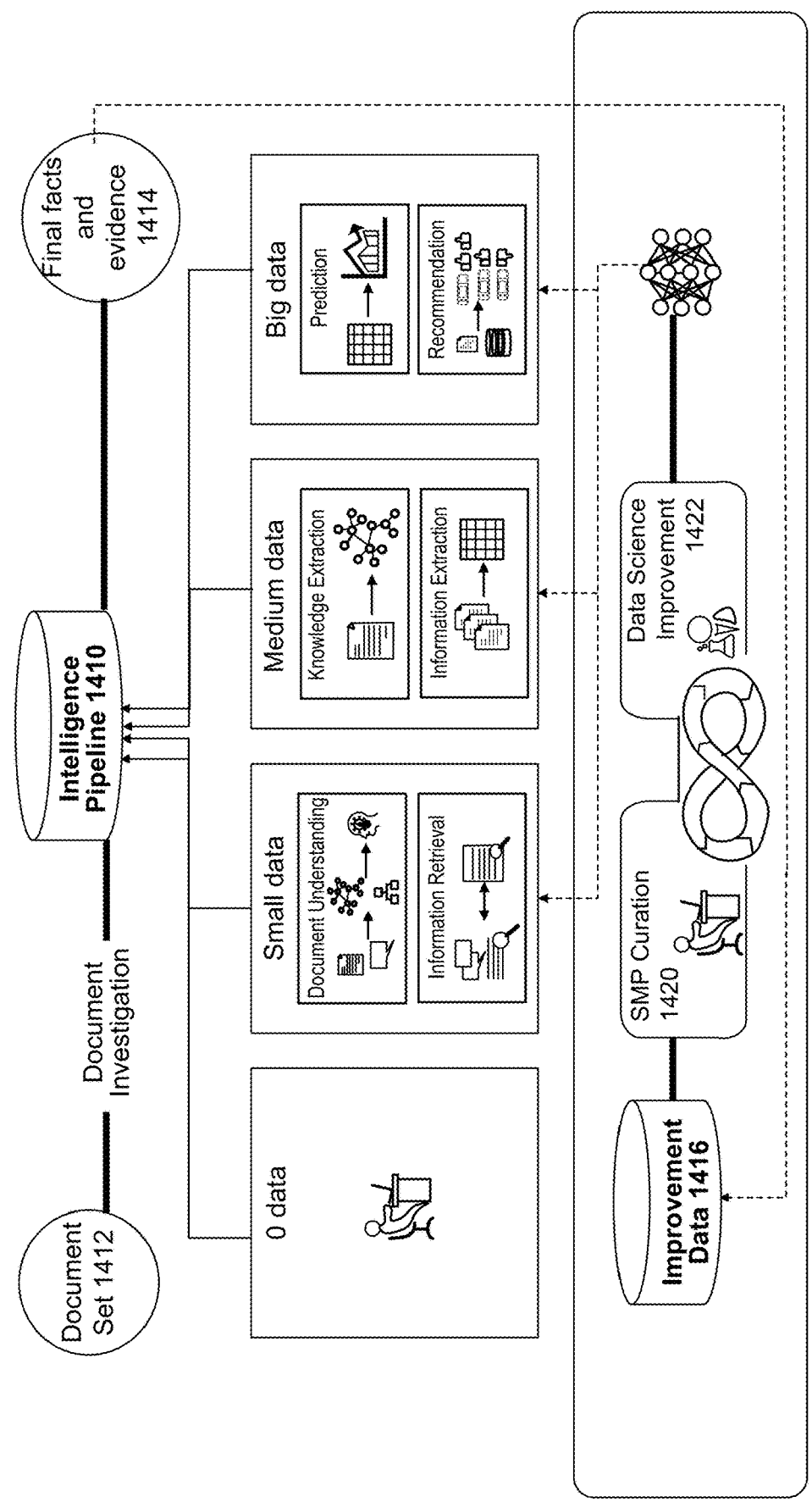
FIG. 14 is an exemplary illustration of a framework, according to an embodiment of the present invention.

FIG. 14 is an exemplary illustration of a framework, according to an embodiment of the present invention. An embodiment of the present invention provides highly accurate identification of attributes during an audit investigation process and facilities generation of an output, such as a summary or workpaper. FIG. 14 shows an exemplary framework that supports AI Virtuous Cycle where insights generated from raw data improve decision making ability at all levels. As shown in FIG. 14, Document Set 1412 may be collected during document investigation. The document set may be stored and managed in an Intelligence Pipeline 1410. This may include data of varying sizes, such as zero data, small data, medium data and big data. Small data may represent data relating to document understanding and information retrieval. Medium data may represent data relating to knowledge extraction and information extract. Big data may include prediction, recommendation and other analytics. Final facts and evidence 1414 may be communicated to improvement data 1416. The system may implement a feedback loop to account for zero to small big data evolution in audit. This may involve various tasks including data extraction, curation, training, validation, export, optimization, deployment and data monitoring. As shown in FIG. 14, an embodiment of the present invention integrates Subject Matter Professional (SMP) Curation 1420 and Data Science Improvement 1422. This analysis may be used for various functions and tasks supported by datasets, including small data, medium data and big data.

As shown in FIG. 14, an embodiment of the present invention is directed to collecting feedback information generated through the use of an application and various applications using the platform. This may include telemetry changes, audit logs, etc. SMP Curation 1420 may represent a review performed by a SMP or team of SMPs. For example, subject matter professionals may access data through an interface/portal and review the collected information.

An embodiment of the present invention is directed to leveraging expertise of the SMP to perform an initial review of the data collected and remove/filter unnecessary and/or irrelevant data, e.g., noise in the system that exists when information is passively collected. The SMP is an entity having expertise and familiarity with the subject matter that is being collected. The platform illustrated in FIG. 14 is designed to accommodate a broad variety of use cases and applications. Accordingly, the data collected is for a specific use case where a distinct SMP may be involved for each use case or application. As shown in FIG. 14, the SMP Curation 1420 filters and performs an initial analysis of the collected data based on a SMP's expertise and experience and then provides the filtered data to Data Scientist Improvement 1422. Through Data Scientist Improvement 1422, data scientists may then perform analysis and iterate on the data to further process and analyze the curated data. Accordingly, SMPs are in the best position to filter and curate the data based on their expertise and familiarity with the subject matter. Data scientists may then analyze and apply the curated data for improved and more accurate data analytics.

According to an embodiment of the present invention, SMP Curation 1420 may be applied to better understand the data. This may involve adding missed examples to a training set as well as identifying missed/new features. The SMP Curation 1420 as applied to audit is particularly useful given the highly heuristic nature of audit data and investigation. With SMP Curation 1420, an embodiment of the present invention is able to apply machine teaching to human decisioning tasks. For example, an SMP may perform investigation on collected audit data. This may include analyzing changes made, deviations from recommendations, details relating to the changes, supporting evidence, etc. This may involve prioritization of certain features, bundling features together and curating good data from bad data.

In the audit process, a SMP may be integrated for data analysis and determinations. An embodiment of the present invention recognizes that the SMP may be best positioned to provide insight over smaller amounts of data with high variability. With SMP involvement, data science improvement may identify when a feature is missing, when training data is needed and further build out models to improve the system. Data science improvement may also apply search features to evidence and collect massive amounts of data which may then be used to perform extractions as well as find and highlight relevant information.

According to an embodiment of the present invention, a SMP may interact with SMP Curation 1420 through a user interface. This may involve assessing performance of different aspects of the platform and providing metrics to inform and guide curation. For example, each sub system of the platform may have different tuning and curation requirements. The user interface may help navigate the differences and curate appropriately for each sub system. It may also trace user decisions and corrections throughout the system to provide context associated with the data to the curating SMPs.

An embodiment of the present invention may include user interfaces relating to data retrieval, interpretation, extraction, and errors/exceptions. Data retrieval interfaces may provide details concerning user run queries. Metrics may include amount of queries per user, amount of clicks per query, frequency of evidence created not in scope per question, frequency of predefined questions, frequency of results per query, etc. A user may further drill down on a specific query. For example, a specific query may include statistics, such as number of defined passages/tables, number of chosen evidence, number of outside of scope, processing time, synonym statistics, etc. Corresponding evidence in the document may be provided.

Interpretation interfaces may display details relating to selected hypothesis. Metrics may include amount of selected hypothesis per question, amount of added (new) evidence per question, value is changed by user per question, amount of evidence per question, etc. Extract interfaces may provide details relating to selected evidence. Metrics may include amount of selected evidence per question, amount of added (new) evidence per question, accepted evidence based on selected hypothesis per question, etc. Errors/exceptions interfaces may provide details relating to errors per question. Metrics may include errors/warnings per collection, all errors from rule-based engine, exception/errors per question, exceptions/errors per component, etc.

An embodiment of the present invention is directed to improving the audit process on the back-end through machine teaching. Machine teaching is particularly useful when little or no training data is available. An exemplary embodiment may actually avoid a need to train the system. As an auditor performs an investigation, the collected data may be used to continuously improve the augmentation on the back-end processing. For example, the innovative system may track the audit process, which may include processes relating to classification, corrections and/or other interactions which are then used to iterate on a model for improved data classification, attribute extraction and/or other functions. The feedback data may be used to improve multiple engines and procedures across the innovative platform.

With an embodiment of the present invention, the system is built to apply learning technologies and therefore evolve and improve over time. An embodiment of the present invention utilizes engines to better understanding document types, document structures, etc. This enables the system to learn and understand any document type and attributes. An embodiment of the present invention is directed to an innovative platform with a learning cycle. As more data, documents and attributes are available and collected, an embodiment of the present invention may apply different types and levels of augmentation in a single system.

It will be appreciated by those persons skilled in the art that the various embodiments described herein are capable of broad utility and application. Accordingly, while the various embodiments are described herein in detail in relation to the exemplary embodiments, it is to be understood that this disclosure is illustrative and exemplary of the various embodiments and is made to provide an enabling disclosure. Accordingly, the disclosure is not intended to be construed to limit the embodiments or otherwise to exclude any other such embodiments, adaptations, variations, modifications and equivalent arrangements. For example, although the disclosure has been directed primarily to automated grading of commercial mortgage loans, it can be used in connection with automated grading of other types of loans, and to automated analysis of other types of contracts and other legal or business documents, for example.

The system described above can be implemented with servers and other computing devices in various configurations. The various servers and computing devices may use software to execute programs to execute the methods described above. Various embodiments of the invention also relate to the software or computer readable medium containing program instructions for executing the above described methods for automated grading of a loan with chained confidence scoring.

Although the foregoing examples show the various embodiments of the invention in one physical configuration; it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

Data and information maintained by the servers and personal computers described above and in the drawings may be stored and cataloged in one or more databases, which may comprise or interface with a searchable database and/or a cloud database. The databases may comprise, include or interface to a relational database. Other databases, such as a query format database, a Standard Query Language (SQL) format database, a storage area network (SAN), or another similar data storage device, query format, platform or resource may be used. The databases may comprise a single database or a collection of databases. In some embodiments, the databases may comprise a file management system, program or application for storing and maintaining data and information used or generated by the various features and functions of the systems and methods described herein.

Communications networks connecting the various computing devices described above may be comprised of, or may interface to any one or more of, for example, the Internet, an intranet, a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The communications networks that connect the various computing devices described above may also comprise, include or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications networks 110, 120 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, the communication networks 110, 120 may comprise a satellite communications network, such as a direct broadcast communication system (DBS) having the requisite number of dishes, satellites and transmitter/receiver boxes, for example. The communications network may also comprise a telephone communications network, such as the Public Switched Telephone Network (PSTN). In another embodiment, communication networks 110, 120 may comprise a Personal Branch Exchange (PBX), which may further connect to the PSTN.

Although examples of servers and personal computing devices are described above, exemplary embodiments of the invention may utilize other types of communication devices whereby a user may interact with a network that transmits and delivers data and information used by the various systems and methods described herein. The personal computing devices may include desktop computers, laptop computers, tablet computers, smart phones, and other mobile computing devices, for example. The servers and personal computing devices may include a microprocessor, a microcontroller or other device operating under programmed control. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art. The personal computing devices may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The personal computing devices may also include a network-enabled appliance or another TCP/IP client or other device. The personal computing devices may include various connections such as a cell phone connection, WiFi connection, Bluetooth connection, satellite network connection, and/or near field communication (NFC) connection, for example.

The servers and personal computing devices described above may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software, firmware, hardware, or a combination of the foregoing.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers and personal computing devices described above may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

In the system and method of exemplary embodiments of the invention, a variety of "user interfaces" may be utilized to allow a user to interface with the personal computing devices. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A computer-implemented system for implementing an augmented audit document investigation tool, the system comprising:
    a database that stores and manages collected audit data from an audit process;
    a document ingestion interface that uploads one or more documents in a plurality of data formats, digitizes each of the one or more documents into a set of data elements and converts each set of data elements into a machine readable format;
    a document classification processor that classifies each set of data elements based on a document type for each of the one or more documents, collects metadata corresponding to each of the one or more documents, and prioritizes the one or more documents based on the collected metadata;
    an investigation module that comprises a search engine and an extraction engine:
        the search engine is configured to apply a machine learning algorithm for the purpose of:
            searching each set of data elements for each of the one or more documents to identify a subset of the data elements comprising the search results, the searching comprising identifying data closest to where the machine learning algorithm determines a targeted data value resides;
            ranking the search results to prioritize the one or more documents;
            confirming the digitization of each of the one or more documents based on the ranking of the search results; and
            generating ranked context from the search results for the subset of data elements;
        the extraction engine configured to apply the machine learning algorithm to:
            extract fact values from the ranked context;
            interpret the extracted fact values;
            rank the extracted and interpreted fact values;
            generate annotated context for the ranked fact values;
            apply the ranked fact values and annotated context to a plurality of hypotheses generated by the machine learning algorithm;
    an interactive interface that generates a set of final facts with augmented data during an investigation stage of the audit process based on a review of the plurality of hypotheses wherein the augmented data comprises the annotated context based on the extracted fact values;
    an audit module configured to:
        receive the set of final facts and determine whether the set of final facts is acceptable;
        recalculate the set of final facts upon determining that the set of final facts are not acceptable, and deliver a conclusion comprising a reviewed contract;
        analyze the reviewed contract for insights comprising external factors and engagement insights;
        improving the machine learning algorithm by using auditor feedback on the set of final facts with augmented data as feedback into the machine learning algorithm;

wherein the interactive interface provides access to supporting evidence relating to the annotated context based on a user input.

2. The system of claim 1, wherein the audit document investigation tool is linkable to one or more other platforms for full audit trail and additional review.

3. The system of claim 1, wherein the interactive interface enables a user to navigate through the one or more documents during the investigation stage of the audit process.

4. The system of claim 1, wherein the audit document investigation tool is integrated with a cloud platform that provides machine learning and discovery features.

5. The system of claim 1, further comprises: a procedure review workflow module that provides insights from internal and external data and enables workpaper compilation and review.

6. The system of claim 1, wherein the extraction engine comprises a natural language processor.

7. The system of claim 1, wherein the one or more documents comprise unstructured data, semi-structured data and mixed data.

8. The system of claim 1, wherein the document type comprises: sub-ledger, invoice, confirmation, lease agreement, broker statement, board minutes, sales invoice, derivative type, revenue contract, financial statement.

9. The system of claim 1, wherein the audit document investigation tool comprises a learning component that generates improvement data analyzed by a subject matter professional (SMP) Curation module and Data Science Improvement module.

10. The system of claim 1, wherein the audit document investigation tool uses the collected audit data to continuously improve on the augmented data and iterate on a data model for improved data classification and data extraction.

11. A computer-implemented method for implementing an augmented audit document investigation tool, the method comprising the steps of:
   storing and managing, via a database, collected audit data from an audit process;
   uploading, via a document ingestion interface, one or more documents in a plurality of data formats, wherein the document ingestion interface is further configured to: digitize each of the one or more documents into a set of data elements and convert each set of data elements into a machine readable format;
   classifying, via a document classification processor, each set of data elements based on a document type for each of the one or more documents, collects metadata corresponding to each of the one or more documents, and prioritizes the one or more documents based on the collected metadata;
   applying a machine learning algorithm for the purpose of:
      searching, via a search engine, each set of data elements for each of the one or more documents to identify a subset of the data elements comprising the search results, the searching comprising identifying data closest to where the machine learning algorithm determines a targeted data value resides;
      ranking the search results to prioritize the one or more documents;
      confirming the digitization of each of the one or more documents based on the ranking of the search results; and
      generating ranked context from the search results for the subset of data elements;
      extracting, via an extraction engine, fact values from the ranked context;
      interpreting, via the extraction engine, the extracted fact values;
      ranking, via the extraction engine, the extracted and interpreted fact values;
      generating, via the extraction engine, annotated context for the ranked fact values;
      applying the ranked fact values and annotated context to a plurality of hypotheses generated by the machine learning algorithm;
   generating, via an interactive interface, a set of final facts with augmented data during an investigation stage of the audit process based on a review of the plurality of hypotheses wherein the augmented data comprises the annotated context based on the extracted fact values;
   receiving, via an audit module, the set of final facts and determining whether the set of final facts is acceptable;
   recalculating, via the audit module, the set of final facts upon determining that the set of final facts are not acceptable, and deliver a conclusion comprising a reviewed contract;
   analyzing, via the audit module, the reviewed contract for insights comprising external factors and engagement insights;
   improving the machine learning algorithm by using auditor feedback on the set of final facts with augmented data as feedback into the machine learning algorithm wherein the interactive interface provides access to supporting evidence relating to the annotated context based on a user input.

12. The method of claim 11, wherein the audit document investigation tool is linkable to one or more other platforms for full audit trail and additional review.

13. The method of claim 11, wherein the interactive interface enables a user to navigate through the one or more documents during the investigation stage of the audit process.

14. The method of claim 11, wherein the audit document investigation tool is integrated with a cloud platform that provides machine learning and discovery features.

15. The method of claim 11, further comprising the step of:
   providing, via a procedure review workflow module, insights from internal and external data and enables workpaper compilation and review.

16. The method of claim 11, wherein the extraction engine comprises a natural language processor.

17. The method of claim 11, wherein the one or more documents comprise unstructured data, semi-structured data and mixed data.

18. The method of claim 11, wherein the document type comprises: sub-ledger, invoice, confirmation, lease agreement, broker statement, board minutes, sales invoice, derivative type, revenue contract, financial statement.

19. The method of claim 11, wherein the audit document investigation tool comprises a learning component that generates improvement data analyzed by a subject matter professional (SMP) Curation module and Data Science Improvement module.

20. The method of claim 11, wherein the audit document investigation tool uses the collected audit data to continuously improve on the augmented data and iterate on a data model for improved data classification and data extraction.

* * * * *